United States Patent
Taira et al.

(10) Patent No.: US 8,756,606 B2
(45) Date of Patent: Jun. 17, 2014

(54) SAFETY CONTROLLER AND SAFETY CONTROL METHOD IN WHICH TIME PARTITIONS ARE SCHEDULED ACCORDING TO A SCHEDULING PATTERN

(75) Inventors: Tetsuya Taira, Nisshin (JP); Hiroshi Bitoh, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/522,875

(22) PCT Filed: Jan. 31, 2011

(86) PCT No.: PCT/JP2011/000527
§ 371 (c)(1),
(2), (4) Date: Jul. 18, 2012

(87) PCT Pub. No.: WO2012/104899
PCT Pub. Date: Aug. 9, 2012

(65) Prior Publication Data
US 2012/0291036 A1   Nov. 15, 2012

(51) Int. Cl.
*G06F 9/455* (2006.01)
*G06F 9/46* (2006.01)

(52) U.S. Cl.
USPC .......................................... 718/103; 718/104

(58) Field of Classification Search
None
See application file for complete search history.

(56) References Cited

U.S. PATENT DOCUMENTS

| | | | | |
|---|---|---|---|---|
| 6,301,634 B1* | 10/2001 | Gomi et al. | ............ | 710/267 |
| 7,818,751 B2* | 10/2010 | Togawa | ............ | 718/108 |
| 2009/0210879 A1 | 8/2009 | Kaiser et al. | | |
| 2011/0107342 A1* | 5/2011 | Dodge et al. | ............ | 718/103 |
| 2012/0029659 A1* | 2/2012 | Taira et al. | ............ | 700/14 |
| 2012/0197416 A1* | 8/2012 | Taira et al. | ............ | 700/14 |
| 2012/0198464 A1* | 8/2012 | Taira et al. | ............ | 718/103 |
| 2012/0245709 A1* | 9/2012 | Taira et al. | ............ | 700/11 |

FOREIGN PATENT DOCUMENTS

| | | | |
|---|---|---|---|
| JP | 62-245304 | A | 10/1987 |
| JP | 07-074786 | A | 3/1995 |
| JP | 11-065992 | A | 3/1999 |
| JP | 11-175357 | A | 7/1999 |
| JP | 2002-086379 | A | 3/2002 |
| JP | 2002-099435 | A | 4/2002 |

(Continued)

OTHER PUBLICATIONS

English Translation of (JP 2010271759 A, Dec. 2010, Japan, Yamauchi, Minoru).*

(Continued)

*Primary Examiner* — Meng An
*Assistant Examiner* — Bradley Teets
(74) *Attorney, Agent, or Firm* — Kenyon & Kenyon LLP

(57) ABSTRACT

Upon occurrence of an abnormality, a safety control can be executed more rapidly. An OS partially includes a partition scheduler that selects and decides a time partition to be subsequently scheduled according to a scheduling pattern including TP1 in which an execution time is allocated to a safety monitoring program, TP2 in which the execution time is allocated to a normal control program, and TP3 in which the execution time is allocated to a safety control program. A processor executes the OS to cause the partition scheduler to periodically operate. The partition scheduler is activated upon detection of an abnormality by one of the safety monitoring program executed in TP1 and the normal control program executed in TP2, and switches the time partition from TP1 or TP2 to TP3.

12 Claims, 21 Drawing Sheets

(56) References Cited

FOREIGN PATENT DOCUMENTS

| JP | 2002-287987 | A | 10/2002 |
| JP | 2006-285724 | A | 10/2006 |
| JP | 2008-191823 | A | 8/2008 |
| JP | 2010-271759 | A | 12/2010 |
| JP | 2010271759 | A * | 12/2010 |

OTHER PUBLICATIONS

International Search Report mailed Feb. 22, 2011 of PCT/JP2011/000527.

* cited by examiner

SAFETY CONTROLLER AND SAFETY CONTROL METHOD IN WHICH TIME PARTITIONS ARE SCHEDULED ACCORDING TO A SCHEDULING PATTERN

This is a 371 national phase application of PCT/JP2011/000527 filed 31 Jan. 2011, the contents of which are incorporated herein by reference.

TECHNICAL FIELD

The present invention relates to a safety controller mounted in a service robot, transportation equipment, and the like to ensure functional safety, and particularly to a safety controller using a computer system.

BACKGROUND ART

Service robots are required to ensure functional safety by constantly monitoring a safety state using an external sensor and a self-diagnosis device and by executing appropriate safety control logic upon detecting some risk.

IEC 61508 has been established as an international standard for functional safety of the service robots described above as well as systems which operate on an electrical principle, such as transportation equipment. In IEC 61508, a system provided to ensure functional safety is called a safety-related system. IEC 61508 defines various techniques for constructing the safety-related system using hardware, such as a microprocessor and a PLC (Programmable Logic Controller), and a computer program (software). The use of techniques defined in IEC 61508 makes it possible to construct the safety-related system using a computer system.

Meanwhile, in recent years, the throughput of programmable electronic devices, such as a microprocessor, has been improved. Accordingly, various application programs are executed in parallel on a computer system by using a multi-task OS (Operating System), thereby enabling integration of computer systems which are mounted in equipment, such as a service robot and a vehicle, for various purposes.

Patent Literature 1, for example, discloses a technique for causing an application program related to ensuring of functional safety (hereinafter, referred to as "safety-related application") to run on a computer system together with another application program (hereinafter, referred to as "non-safety-related application").

When the techniques defined in IEC 61508 are applied to the entire software including the safety-related application and the non-safety-related application, a need arises to apply the techniques also to the non-safety-related application. This causes a problem of an increase in software development cost.

Thus, in the technique disclosed in Patent Literature 1, safety-related applications (a safety monitoring program and a safety control program) are made independent from a non-safety-related application (a normal control program) by time partitioning of a system program. Accordingly, the normal control program can be excluded from the safety-related system, which contributes to a reduction in cost of the safety-related system constructed using a computer system.

CITATION LIST

Patent Literature

[Patent Literature 1] Japanese Unexamined Patent Application Publication No. 2010-271759

SUMMARY OF INVENTION

Technical Problem

However, a safety controller of a related art as illustrated in Patent Literature 1 has problems as described below.

A first problem will now be described. In the related art having a time partitioning function, if an abnormality is detected in a time partition in which the safety monitoring program is executed and the program is switched to the safety control program to be executed, the time partition cannot be changed until the end of the time resource of the time partition in which the safety monitoring program is executed. Even in the case where a configuration in which the normal control program itself can detect an abnormality is employed and the normal control program itself detects an abnormality during execution of the normal control program, it is impossible for the related art to take measures against the abnormality by execution of the safety control program, until the abnormality related to the execution of the normal control program is detected by the safety monitoring program and the time partition is switched in response to a notification from the safety monitoring program. Thus, the related art has a problem in that the execution of measures against an abnormality is delayed upon occurrence of an abnormality, which may cause another abnormality.

Next, a second problem will be described. In the related art having the time partitioning function, scheduling is carried out such that partition scheduling is executed first and task scheduling is then executed, because much emphasis is placed on a time constraint. Accordingly, there is a possibility that the flexibility in designing priorities of tasks is impaired and that time partitions including only high-priority tasks or time partitions including only low-priority tasks, for example, are scheduled as the tasks arranged in the time partitions. However, the scheduling of the time partitions and tasks depends not only on the priorities but also on the periodicity, so that the related art cannot solve the problem inherent in such scheduling.

If such a constraint that one task is disposed in one time partition is imposed so as to solve the problem inherent in such scheduling, the number of times of switching time partitions increases unnecessarily, which causes a problem of deterioration in efficiency of the entire system.

Referring to FIG. 17, the second problem will be described in more detail.

FIG. 17 shows a specific example of time scheduling and task scheduling according to the related art. In FIG. 17, time partition scheduling is set to a QoS slot based on priorities. A time partition set to the QoS slot is caused to operate, and processing for an allocation time (a processing time of the QoS slot) related to the time partition is executed to thereby allow the QoS slot to advance. When the time partition set to the QoS slot is changed, the time partition is switched.

According to the scheduling of the related art, as a result of the scheduling, the task included in TP2(B) requires execution results of the task included in TP1. For this reason, the tasks related to TP2 are divided into the task included in TP2(A) and the task included in TP2(B) to be arranged. However, originally, the task included in TP2(A) and the task included in TP2(B) are closely related to each other, so it is preferable to arrange the tasks in the same time partition, if possible. The task included in TP1 is a task for handling input and output of a sensor or the like, and the task included in TP1 has a high priority and a high periodicity. Therefore, it is preferable to execute such a task at a higher period, if possible.

A more detailed description will be made using another example. Regarding the scheduling of time partitions and tasks, consider the case where the ideal order of partitions is "TP2(A1), TP1, TP2(A2), TP1, TP2(B1), TP1, TP2(B2), . . ." in consideration of the respective priorities and periodicities, and desired tasks are arranged in the respective time partitions.

In the related art, the following two scheduling methods can be adopted to achieve the ideal execution order described above. As a first method, it is possible to employ such a scheduling method that "a time for a time partition in which only the task of TP2(A1) can be executed is ensured; a time for a time partition in which the task of TP1 can be executed is ensured; a time for a time partition in which only TP2(A2) can be executed is ensured, . . . ". In this method, however, it is difficult to efficiently allocate a time to each time partition, which results in deterioration of the efficiency of the entire system.

As a second method, it is possible to employ such a scheduling method that "two tasks in TP2(A) are separated into different time partitions (separated into the task in TP2(A1) and the task in TP2(A2)), and two tasks in TP2(B) are separated into different time partitions (separated into the task in TP2(b1) and the task in TP2(B2)), . . . ". In this method, however, the tasks closely related to each other are separated, which results in the necessity of using an unnecessarily large memory area and communication between the separated tasks. This causes problems of complexity and increase in size of the system. Therefore, there is a demand for a scheduling method that can satisfy the priority and periodicity of each task in consideration of a time allocated to each time partition.

Next, a third problem will be described. In the related art having the time partitioning function, when tasks in a plurality of time partitions cooperate with each other to perform processing, a partition scheduler secures an execution time related to each time resource. However, this poses a problem as to how to share data that must be shared between the tasks in the plurality of time partitions. In general, a shared memory is often used for sharing data. In this case, however, when a lock occurs due to switching of time partitions during access to the shared memory, or when switching of time partitions occurs during access to the shared memory, which results in switching to a time partition that is not an execution target, for example, no task can access the shared memory. This may disable the system.

Referring to FIGS. 23 and 24, the third problem will be described in more detail.

FIG. 23 is a flowchart showing a specific example of a procedure of the partition scheduler using a technique related to the present invention. Referring to FIG. 23, a case where data written into the shared memory in TP1 is used in TP2 and TP3 will be described by way of example.

First, in TP2, a normal control task 26 in TP2 accesses the shared memory (S181). After a lapse of one tick (S182), the partition scheduler operates and the partition scheduler performs scheduling of each time partition (S183). The time partition is switched from TP2 to TP1 by the scheduling, and execution of a safety monitoring task 24 is started in TP1 (S184).

The safety monitoring task 24 executed in TP1 uses data obtained by executing the normal control task 26 in TP2. Accordingly, the normal control task 26 in TP2 judges whether the shared memory is being accessed (S185). When the shared memory is not being accessed (No in S185), the safety monitoring task 24 access the shared memory and executes processing (S186). When the shared memory is being accessed (Yes in S185), the safety monitoring task 24 cannot access the shared memory, and thus cannot execute processing (S187).

As illustrated in FIG. 24, when any task accesses the shared memory, the other tasks cannot access the shared memory and thus cannot continue the processing. For this reason, switching processing from TP2 to which the normal control task 26 belongs to TP3 to which a safety control task 28 belongs cannot be executed in some cases, with the result that a safety control cannot be executed. Therefore, there is a demand for a technique for avoiding the problems as described above regarding a plurality of time partitions, when data must be shared between tasks in the plurality of time partitions.

The present invention has been made based on the above findings, and has an object to provide a safety controller and a safety control method that can solve the problems as follows. That is, a first problem to be solved is to execute a safety control more rapidly upon occurrence of an abnormality. A second problem to be solved is to achieve scheduling that satisfies the priority and periodicity of each task in consideration of a time allocated to each time partition. A third problem to be solved is to avoid a failure due to data sharing between time partitions.

Solution to Problem

A safety controller according to an aspect of the present invention includes: a hardware resource including at least one processor; and a system program for controlling allocation of an execution time of the processor to (a) a safety monitoring program for monitoring occurrence of an abnormality related to a control target, (b) a normal control program related to control of the control target during normal time, and (c) a safety control program related to control of the control target upon occurrence of an abnormality. The system program partially includes a partition scheduler that selects and decides a time partition to be subsequently scheduled according to a scheduling pattern including (d) a first time partition in which the execution time is allocated to the safety monitoring program, (e) a second time partition in which the execution time is allocated to the normal control program, and (f) a third time partition in which the execution time is allocated to the safety control program. The processor executes the system program to cause the partition scheduler to periodically operate. The partition scheduler is activated upon detection of an abnormality by one of the safety monitoring program executed in the first time partition and the normal control program executed in the second time partition, and performs switching from one of the first time partition and the second time partition to the third time partition.

According to an aspect of the present invention described above, a safety control can be executed more rapidly upon occurrence of an abnormality.

Further, the partition scheduler may be forcibly activated upon detection of an abnormality by the normal control program executed in the second time partition, and may immediately perform switching from the second time partition to the third time partition.

Furthermore, upon detection of an abnormality, the normal control program may judge whether an executable time is left in the second time partition in which the normal control program is executed, and may notify the partition scheduler of a request for switching the time partition when the executable time is left. Upon receiving, from the normal control program, the notification of the request for switching the time partition, the partition scheduler may operate in a subsequent period and may switch the time partition from the second time partition to the third time partition.

Further, the system program may partially further include a task scheduler that performs scheduling of the programs to be executed in the time partitions, and the partition scheduler may cause the task scheduler to operate, and may judge a running status of each of the programs in the time partitions according to the number of times of switching of the programs by the task scheduler.

Furthermore, the partition scheduler may include the task scheduler, and the partition scheduler may cause the task scheduler to operate.

Further, the programs may have respective priorities assigned thereto. One cycle of the time partitions may include a plurality of time partitions, and a time may be allocated to each of the plurality of time partitions. The partition scheduler may decide a program to be subsequently executed according to the priorities of the programs and an executable time left in the time partitions in which the programs are executed, and may perform switching to a time partition including the program decided. As a result, the scheduling that can satisfy the priority and periodicity of each task in consideration of a time allocated to each time partition can be achieved.

Furthermore, the partition scheduler may retrieve a program to be subsequently executed according to the priorities of the programs, and may decide the retrieved program as a program to be subsequently executed, when an executable time is left in the time partition in which the retrieved program is executed.

Further, the partition scheduler may retrieve a time partition having a remaining executable time from the time partitions in which the programs are executed, and may decide a program to be subsequently executed according to the priorities in the time partition retrieved.

The safety controller may further include a shared memory for use in data communication between a first program and a second program, the first program and the second program being selected from among the safety monitoring program, the normal control program, and the safety control program, the shared memory being configured to be divided into a plurality of shared portions. The processor may execute the system program to select and decide the time partition, and when the first program executed in the time partition is accessing any of the shared portions of the shared memory, an access destination of the second program executed in the time partition may be set to a shared portion which is not accessed by the first program and which stores latest update data. As a result, a failure due to data sharing between time partitions can be avoided.

Moreover, the processor may execute the system program to select and decide the time partition, and may judge occurrence of an abnormality when the first program executed in the time partition is accessing any of the shared portions of the shared memory a prescribed number of times or more.

Advantageous Effects of Invention

According to the present invention, it is possible to provide a safety controller and a safety control method that can solve the problems described above.

DESCRIPTION OF EMBODIMENTS

Figure 1:
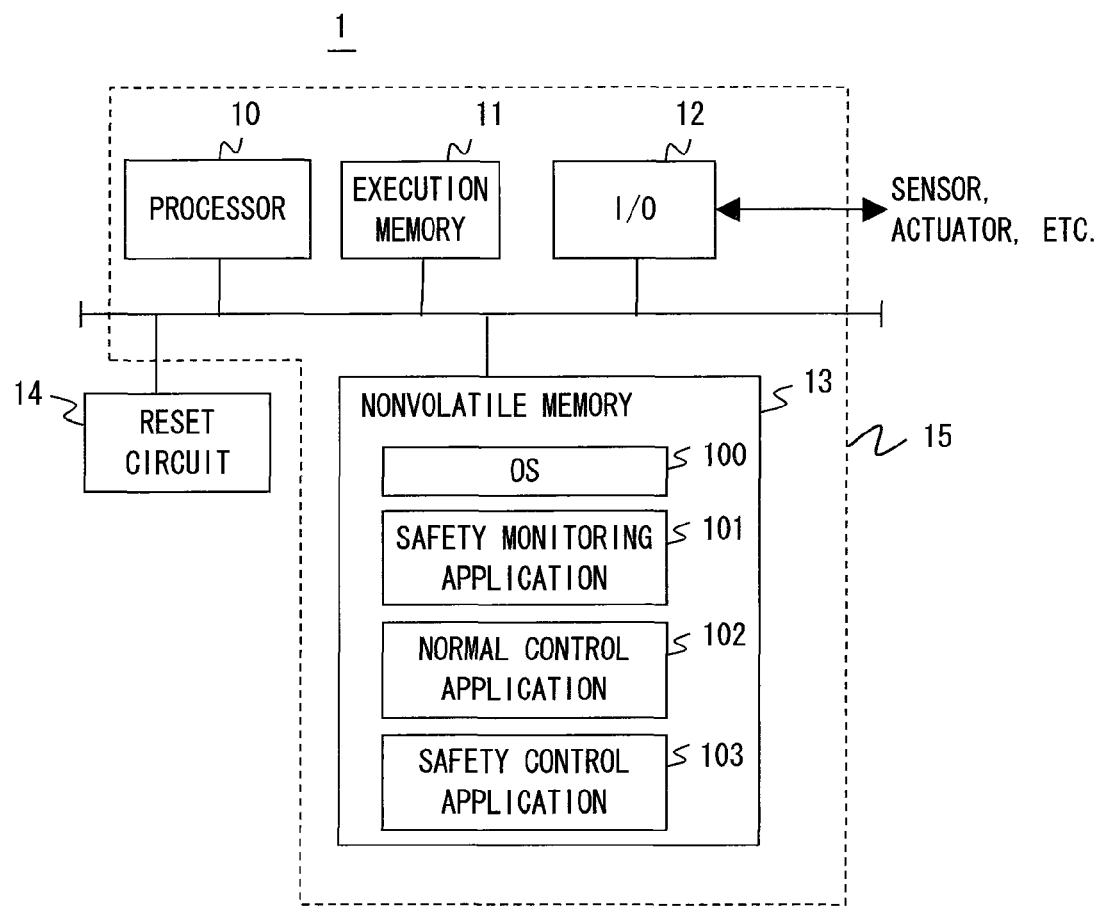
FIG. 1 is a block diagram showing a configuration example of a safety controller according to a first embodiment of the invention.

Exemplary embodiments of the present invention will be described in detail below with reference to the drawings. Throughout the drawings, the same components are denoted by the same reference numerals, and a repeated explanation thereof is omitted as needed for clarity of the explanation.

<First Embodiment of the Invention>

A safety controller 1 according to this embodiment is mounted in a service robot, transportation equipment, or the like and executes safety control for ensuring functional safety. The safety controller 1 is adapted to execute a safety-related application and a non-safety-related application in one computer system. FIG. 1 is a block diagram showing a configuration example of the safety controller 1 according to this embodiment.

A processor 10 fetches programs (instruction stream), decodes instructions, and carries out arithmetic processing according to the result of instruction decoding. Though only one processor 10 is illustrated in FIG. 1, the safety controller 1 may have a multiprocessor configuration including a plurality of processors 10. The processor 10 may be a multicore processor. The processor 10 executes an operating system (OS) 100 as a system program to thereby provide a multiprogramming environment. The multiprogramming environment means an environment in which a plurality of programs are assumed to be executed in parallel by periodically switching a plurality of programs to be executed or by switching programs to be executed upon generation of an event.

Multiprogramming is sometimes called a multiprocess, multithread, multitask, or the like. Each of a process, a thread, and a task indicates a program unit to be executed in parallel in the multiprogramming environment. The multiprogramming environment included in the processor 10 according to this embodiment may be a multiprocess environment or a multithread environment.

An execution memory 11 is a memory used for the processor 10 to execute programs. The execution memory 11 stores programs (the OS 100, applications 101 to 103, etc.), which are loaded from a nonvolatile memory 13, input and output data to and from the processor 10, and the like. Note that the processor 10 may directly execute these programs from the nonvolatile memory 13 without loading the programs from the nonvolatile memory 13 into the execution memory 11.

Specifically, the execution memory 11 may be a randomly accessible volatile memory such as an SRAM (Static Random Access Memory) or a DRAM (Dynamic Random Access Memory). The execution memory 11 of FIG. 1 shows logical units. That is, the execution memory 11 may be implemented as a combination of a plurality of SRAM devices, a combination of a plurality of DRAM devices, or a combination of an SRAM device and a DRAM device, for example.

An I/O port 12 is used for data transmission and reception to and from external devices. When the safety controller 1 is mounted in a service robot, for example, the external devices are a visual sensor capable of measuring obstacles around the service robot, an actuator for causing the service robot to operate, and the like.

The nonvolatile memory 13 is a memory device capable of maintaining storage contents more stably than the execution memory 11 without being supplied with power. The nonvolatile memory 13 is, for example, a ROM (Read Only Memory), a flash memory, a hard disk drive, an optical disk drive, or a combination thereof. The nonvolatile memory 13 stores the OS 100 and the applications 101 to 103. Note that at least a part of the nonvolatile memory 13 may be configured to be removable from the safety controller 1. For example, the memory storing the applications 101 to 103 may be removably mounted. Alternatively, at least a part of the nonvolatile memory 13 may be disposed outside the safety controller 1.

The OS 100 is executed by the processor 10 so as to perform task management including task scheduling, interrupt management, time management, and resource management, and to provide a mechanism for inter-task synchronization and inter-task communication, for example, by using hardware resources such as the processor 10, the execution memory 11, and the nonvolatile memory 13.

In addition, the OS 100 has a function of protecting hardware resources temporally and spatially in order to increase the independence of the safety monitoring application 101 and the safety control application 103, which are related to ensuring of functional safety, from the normal control application 102. Here, the hardware resources include the processor 10, the execution memory 11, and the I/O port 12.

Out of these, temporal protection is performed by partitioning a temporal resource such as an execution time of the processor 10. Specifically, the temporal protection is performed by partitioning the execution time of the processor 10 and allocating a task (a process or a thread) to each partition (referred to as "time partition"). A scheduling function (partition scheduler 21) of the OS 100 provides a guarantee of use of resources, including the execution time of the processor 10, to the task allocated to each time partition (hereinafter, abbreviated as "TP" in some cases).

Figure 2:
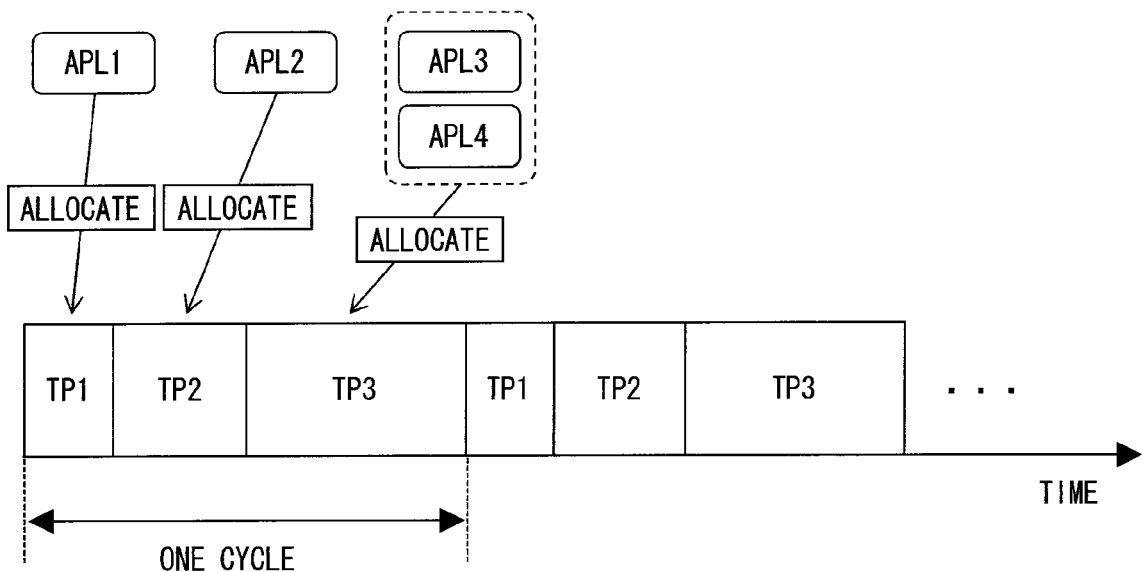
FIG. 2 is a diagram for explaining the concept of time partitioning in the first embodiment of the invention.

FIG. 2 is a conceptual diagram relating to the time partitioning. FIG. 2 shows an example in which a predetermined one-cycle time is divided into three time partitions of TP1, TP2, and TP3. Assuming that the one-cycle time is 100 ticks, the first 20 ticks are defined as TP1, the middle 30 ticks are defined as TP2, and the last 50 ticks are defined as TP3.

In the example shown in FIG. 2, a first application (APL1) to a fourth application (APL4) are allocated to any of TP1 to TP3. The scheduling function (partition scheduler 21) of the OS 100 selects and decides one of TP1 to TP3 to be activated according to a lapse of time. Then, the application allocated to the active TP is executed by the processor 10.

Meanwhile, spatial protection is performed by partitioning stationary resources, including the execution memory 11 and the I/O port 12, and by allocating a task to each partition (referred to as "resource partition"). The scheduling function (partition scheduler 21) of the OS 100 inhibits the task from exceeding the resource partition preliminarily allocated (hereinafter, abbreviated as "RP" in some cases) and from accessing other resources.

Figure 3:
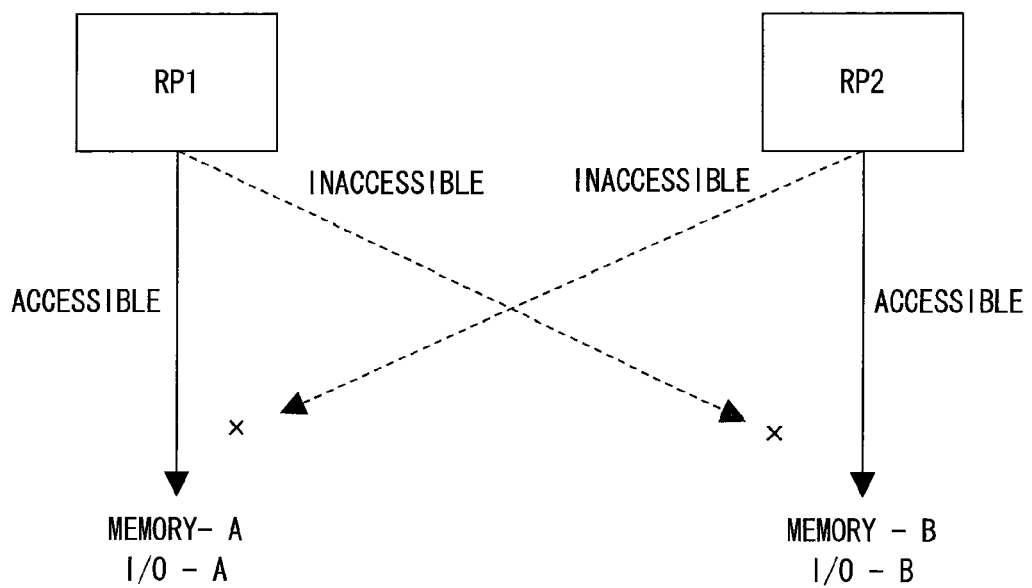
FIG. 3 is a conceptual diagram for explaining the concept of resource partitioning in the first embodiment of the invention.

FIG. 3 is a conceptual diagram relating to the resource partitioning. The example of FIG. 3 shows two RPs (RP1 and RP2). A part (A area) of each of the nonvolatile memory 13 and the execution memory 11 and a part (port A) of the I/O port 12 are allocated to RP1. Further, another part (B area) of each of the execution memory 11 and the nonvolatile memory 13 and another part (port B) of the I/O port 12 are allocated to RP2. Access from RP1 to the resources allocated to RP2 is inhibited, and access from RP2 to the resources allocated to RP1 is inhibited.

Note that there is no need to exclusively allocate all the resources to any one of RPs. That is, the resources may be shared by a plurality of RPs. For example, in the case of performing safety control of a service robot, it is necessary for the actuator to be accessible from both the normal control application 102 and the safety control application 103. Accordingly, the I/O port for controlling the actuator may be shared by the RP to which the normal control application 101 belongs and the RP to which the safety control application 102 belongs.

Returning to FIG. 1, the description will be continued. The applications 101 to 103 are executed in the multiprogramming environment provided by the OS 100 and the processor 10. Among these applications, the safety monitoring application 101 includes instruction code for causing the processor 10 to execute monitoring of the running status of the normal control application 102, monitoring of the running status of the safety control application 103, and monitoring of the input and output data to and from the I/O port 12. The safety monitoring application 101 also includes instruction code for causing the processor 10 to execute notification of a result to the partition scheduler 21. That is, the safety monitoring application 101 is a safety-related application.

Further, the normal control application 102 includes instruction code for causing the processor 10 to execute a control procedure to cause a control target, such as a service robot, to execute a normal function/operation. The normal control application 102 also includes instruction code for causing the processor 10 to execute notification of the result to the partition scheduler 21. That is, the normal control application 102 is a non-safety-related application.

Furthermore, the safety control application 103 includes instruction code for causing the processor 10 to execute a control procedure prescribed to ensure functional safety in a case where some abnormality is detected. The safety control application 103 also includes instruction code for causing the processor 10 to execute notification of the result to the partition scheduler 21. That is, the safety control application 103 is a safety-related application.

A reset circuit 14 resets a microcontroller 15 based on a signal from the OS 100. The mechanism for resetting the microcontroller 15 using the reset circuit 14 will be described later.

Figure 4:
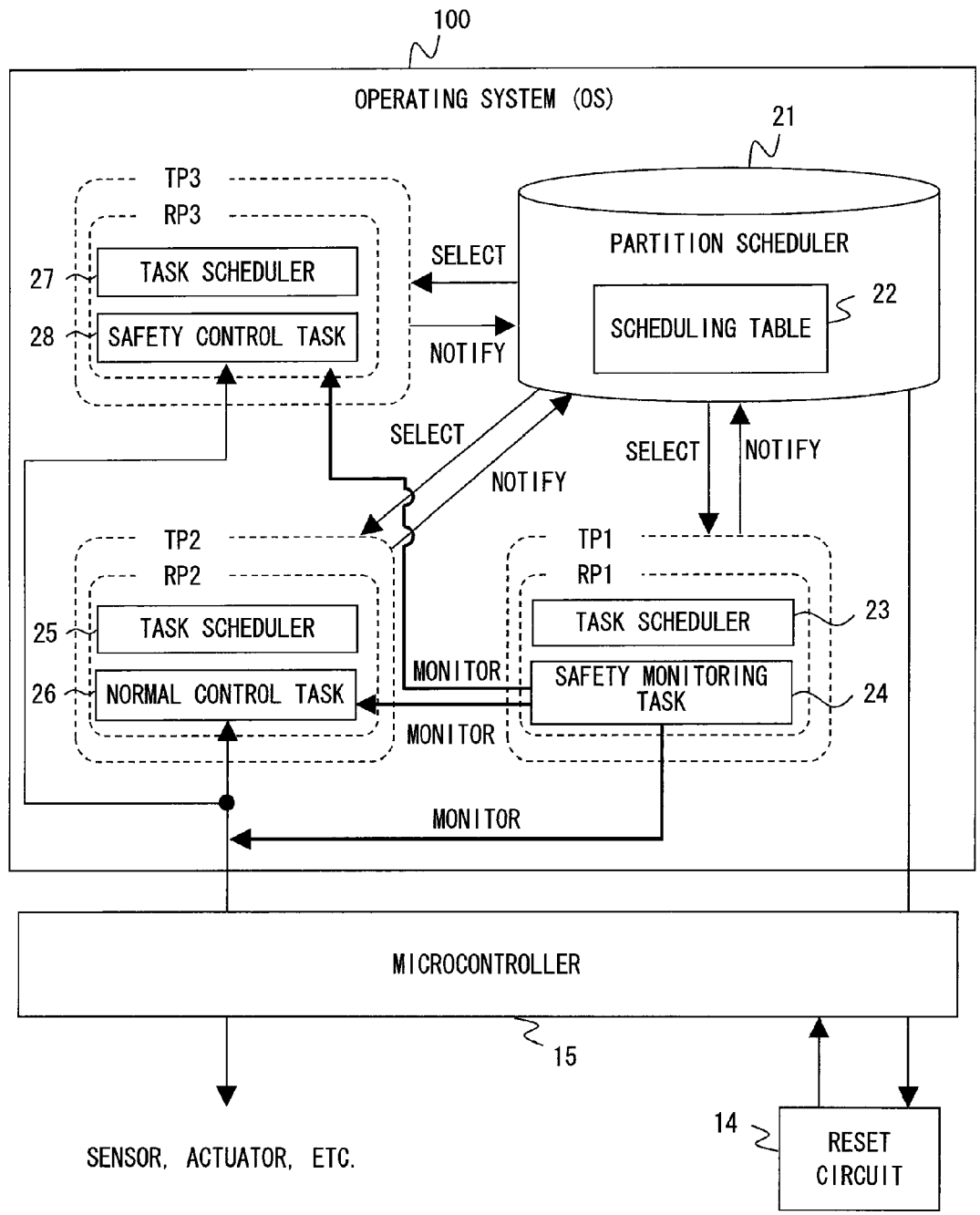
FIG. 4 is a diagram showing relationships between a partition scheduler and tasks which are activated in an execution environment provided by an OS shown in FIG. 1.

Subsequently, relationships between the partition scheduler 21 and tasks generated upon activation of the applications 101 to 103 will be described with reference to FIG. 4. FIG. 4 is a diagram showing the relationships between the partition scheduler 21 and tasks 24, 26, and 28 which are activated in the multiprogramming environment provided by the OS 100.

The microcontroller 15 includes the processor 10, the execution memory 11, the I/O port 12, and the nonvolatile memory 13. While FIG. 4 illustrates a configuration in which the reset circuit 14 is provided outside the microcontroller 15, a configuration in which the reset circuit 14 is included in the microcontroller 15 may also be employed.

The microcontroller 15 is supplied with a clock signal from an external clock source, and the processor 10 and the like operate in a predetermined timer period based on the clock signal. This embodiment is described assuming that the predetermined timer period is one tick. Accordingly, when the OS 100 is executed by the processor 10, the partition scheduler 21 operates every one tick. In the TPs, task schedulers 23, 25, and 27 and the tasks (the safety monitoring task 24, the normal control task 26, and the safety control task 28) operate every one tick.

The partition scheduler 21 operates every one tick and switches the TP (partition scheduling). The partition scheduler 21 selects and decides one of TP1 to TP3 to be activated in the next one tick. Further, the partition scheduler 21 starts operation of the task scheduler on the selected TP.

Specifically, the partition scheduling is performed by the partition scheduler 21 in such a manner that the partition scheduler 21 refers to a scheduling table 22 to perform the partition scheduling in accordance with a scheduling pattern defining a setting of each TP.

The scheduling table 22 holds scheduling patterns each defining a switching order and a timing of each TP. Note that the scheduling table 22 holds at least two different scheduling patterns. One is a scheduling pattern applied when abnormality detection is not performed by the safety monitoring task 24 (i.e., during normal time). The other is a scheduling pattern applied when an abnormality is detected by the safety monitoring task 24. Hereinafter, the scheduling pattern applied during normal time is called a "normal control scheduling pattern", and the scheduling pattern applied upon detection of an abnormality is called a "safety control scheduling pattern".

Figure 5A:
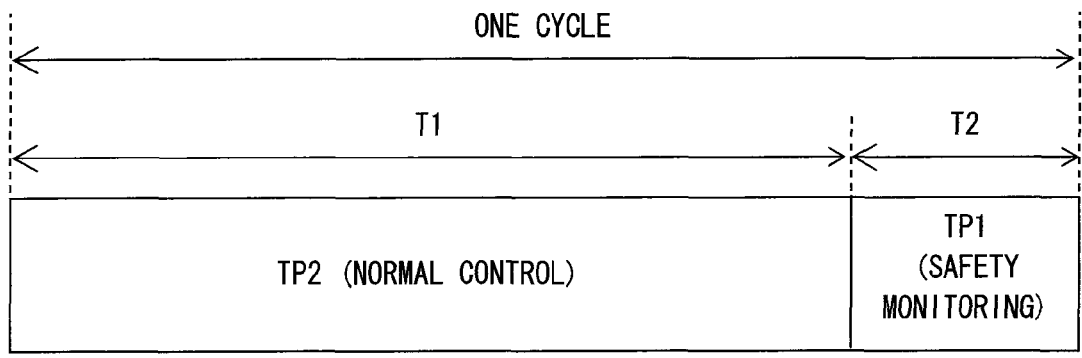
FIG. 5A is a diagram showing a specific example of a scheduling pattern.

FIG. 5A shows a specific example of the normal control scheduling pattern. In FIG. 5A, TP2 to which the normal control task 26 belongs is allocated to the first half (T1) of the one-cycle time. Further, TP1 to which the safety monitoring task 24 belongs is allocated to the latter half (T2) of the one-cycle time. According to the scheduling pattern shown in FIG. 5A, the normal control task 26 and the safety monitoring task 24 are repeatedly scheduled.

Figure 5B:
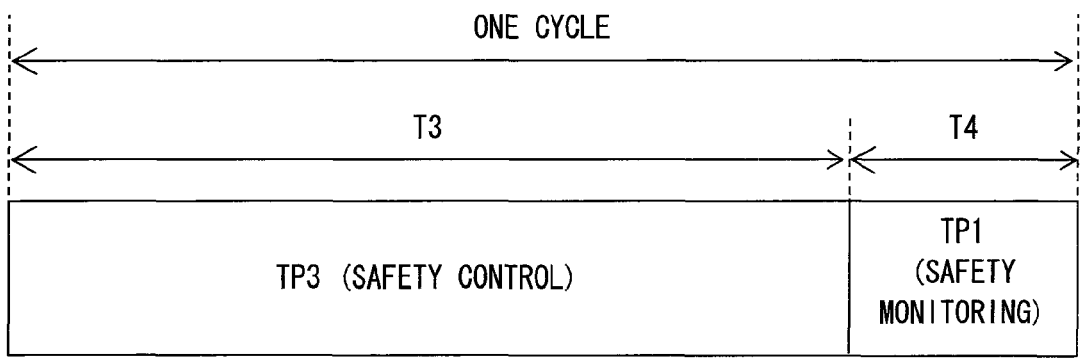
FIG. 5B is a diagram showing a specific example of a scheduling pattern.

FIG. 5B shows a specific example of the safety control scheduling pattern. In FIG. 5B, TP3 to which the safety control task 28 belongs is allocated to the first half (T3) of the one-cycle time. Further, TP1 to which the safety monitoring task 24 belongs is allocated to the latter half (T4) of the one-cycle time. According to the scheduling pattern shown in FIG. 5B, the safety control task 28 and the safety monitoring task 24 are repeatedly scheduled.

Returning to FIG. 4, the description will be continued. The task schedulers 23, 25, and 27 schedule the tasks in the TPs to which the task schedulers respectively belong. Typical scheduling based on priorities may be applied to the scheduling of the tasks in the TPs. Note that FIG. 4 illustrates that each TP includes only one task, but in practice, each TP includes one or more tasks. For example, TP2 for normal control may include two tasks: a normal control task A and a normal control task B.

The safety monitoring task 24 is a task generated upon activation of the safety monitoring application 101. In the example shown in FIG. 4, the safety monitoring task 24 is allocated to TP1 and RP1. The safety monitoring task 24 monitors the running status of the normal control task 26, which is a non-safety-related application, monitors the safety control task 28, which is a safety-related application, and monitors the input and output data to and from the I/O port 12. Furthermore, the safety monitoring task 24 notifies the partition scheduler 21 of the running status of the task.

The normal control task 26 is a task generated upon activation of the normal control application 102. In the example shown in FIG. 4, the normal control task 26 is allocated to TP2 and RP2. The normal control task 26 performs a control procedure for causing a control target, such as a service robot, to execute a normal function/operation. Furthermore, the normal control task 26 notifies the partition scheduler 21 of the running status of the task.

The safety control task 28 is a task generated upon activation of the safety control application 103. In the example shown in FIG. 4, the safety control task 28 is allocated to TP3 and RP3. The safety control task 28 performs a control procedure prescribed to ensure functional safety in a case where some abnormality is detected. Furthermore, the safety control task 28 notifies the partition scheduler 21 of the running status of the task. Note that various techniques may be employed as a specific configuration for notifying the results from each task to the partition 21. For example, a task may invoke a system call (service call) of the OS 100, and results may be notified to the partition scheduler 21 through the OS 100. Alternatively, assuming that a flag related to the running status of a task is stored in the execution memory 11, the task may set the value of the flag according to the running status of the task, and the partition scheduler 21 may judge the running status of the task according to the set value of the flag.

As described above, the partition scheduler 21 operates every one tick to select and decide one of TP1 to TP3 to be activated. Further, the partition scheduler 21 starts operation of the task scheduler on the selected TP. Then, when the task schedulers 23, 25, and 27 start operation, the task scheduling is carried out, and the processor 10 executes the tasks in the TP in the order of the tasks scheduled by the task schedulers 23, 25, and 27. Thus, the application allocated to the active TP is executed by the processor 10.

Figure 6:
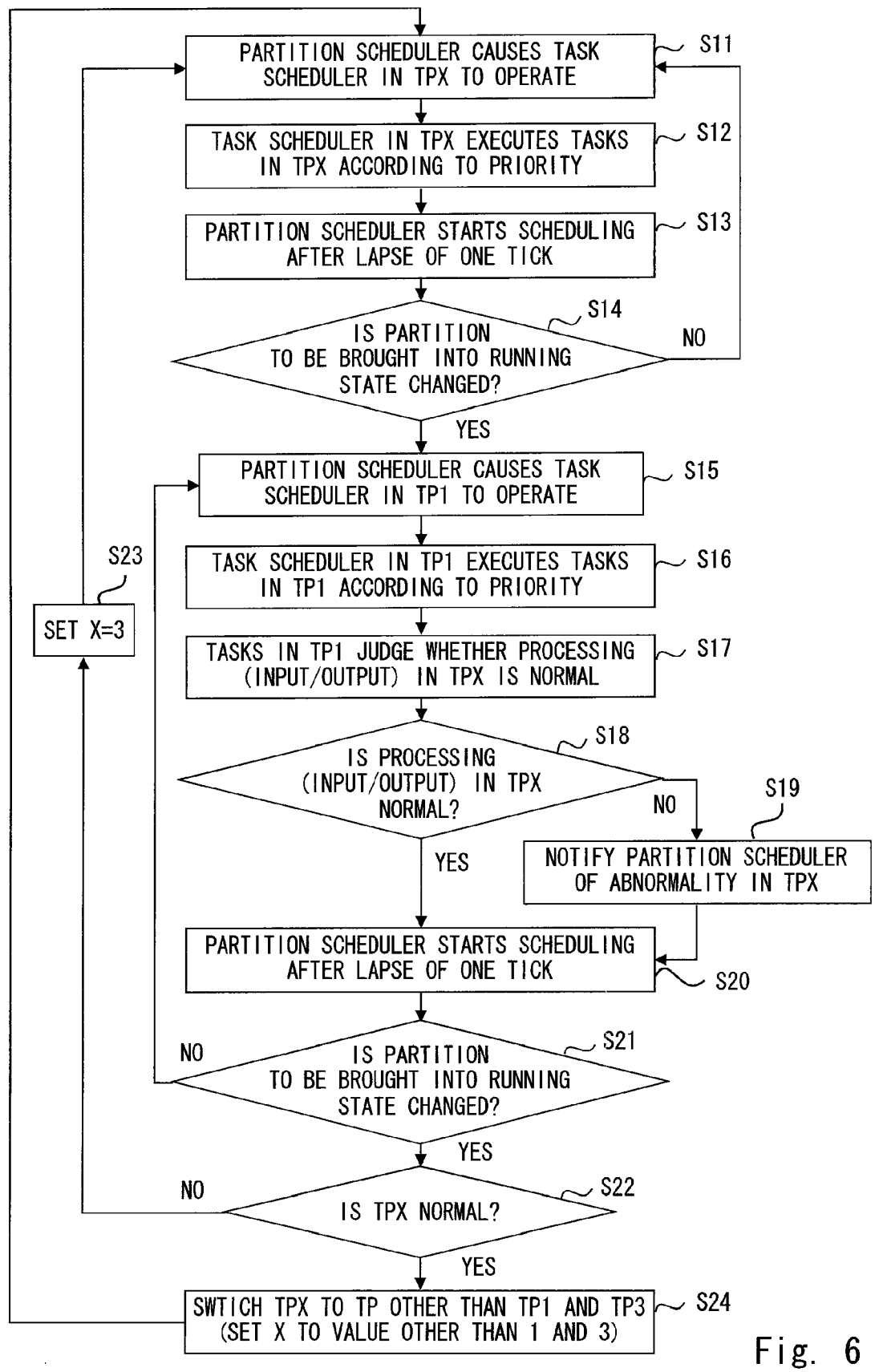
FIG. 6 is a flowchart showing a specific example of a procedure of the partition scheduler.

Subsequently, the partition scheduling performed by the partition scheduler 21 will be described with reference to FIG. 6. FIG. 6 is a flowchart showing a specific example of a procedure of the partition scheduler 21. Referring to FIG. 6, a case is described by way of example in which the scheduling is executed in accordance with the normal control scheduling pattern (for example, FIG. 5A) or the safety control scheduling pattern (for example, FIG. 5B). In other words, a case is described by way of example in which when TP1 is a TP subsequent to TP2 or TP3 and when an abnormality of TP2 is detected in TP1, TP3 is a TP subsequently selected and decided upon reception of the result from TP1.

First, the partitioning scheduler 21, which operates every one tick, causes the task scheduler in TPX to operate (S11). Here, a variable X represents a TP number, and X is a value other than 1. Specifically, in S11, one of TP2 and TP3, excluding TP1 for safety monitoring, is caused to operate.

The task scheduler in TPX having started operation in S11 executes tasks in TPX according to priority (S12). After a lapse of one tick, the partition scheduler 21 starts scheduling of TPs (S13). Specifically, the partition scheduler 21 selects and decides one of TPs to be activated in the next one tick in accordance with the scheduling pattern.

When the TP to be subsequently activated is not changed (No in S14), the partition scheduler 21 returns to S11 to continue operation on the same TPX. Accordingly, before the timing when TPX is switched, the processing of S11 to S14 is repeated.

When the TP to be subsequently activated is changed (Yes in S14), the partition scheduler 21 causes the task scheduler in the time partition to be changed to operate (S15). Here, the task scheduler in TP1 is caused to operate. Then, the task scheduler 23 in TP1 executes the tasks in TP1 according to priority (S16).

The safety monitoring task 24 executed in TP1 monitors the running status of the normal control task 26 and monitors the input and output data to and from the I/O port 12, to thereby judge whether these are normal (S17). As a result of the judgment, when it is judged that they are abnormal (No in S18), the safety monitoring task 24 notifies the partition scheduler 21 of the result (S19).

After a lapse of one tick, the partition scheduler 21 resumes scheduling (S20). The partition scheduler 21 selects and decides which TP is to be activated in the next one tick in accordance with the scheduling pattern. When the TP to be subsequently activated is not changed (No in S21), the flow returns to S15 to continue the operation on TP1.

When the TP to be subsequently activated is changed (Yes in S21), the partition scheduler 21 further judges whether TPX has been normal according to the result notified from TP1 in S19 (S22). As a result of judgment, when it has been abnormal (No in S22), the partition scheduler 21 selects and decides TP3 as the TP to be activated in the next one tick (S23).

As a result of judgment, when it has been normal (Yes in S22), the partition scheduler 21 selects and decides TPX other than TP1 and TP3 as the TP to be activated in the next one tick (S24).

As for the processing shown in FIG. 6, a specific example of the partition scheduling will be described.

First, a case will be described in which scheduling is started in S11 in accordance with the normal control scheduling pattern illustrated in FIG. 5A. In this case, the scheduling is started in S11 assuming that TPX=TP2, and TPX=TP2 is maintained during the processing of S12 to S14. Then, TPX is changed from TP2 to TP1 in S15, and TP1 remains unchanged during the processing of S15 to S21. When it is determined that the running status (data input and output) related to TP2 is normal in S18, TPX=TP2 is satisfied in S24 (that is, the normal control scheduling pattern starting from TP2 is continued). Meanwhile, when it is determined that the running status (data input and output) related to TP2 is abnormal in S18, TPX=TP3 is satisfied in S23 (that is, the scheduling pattern is switched to the safety control scheduling pattern starting from TP3).

Further, a case will be described in which scheduling is started in S11 in accordance with the safety control scheduling pattern illustrated in FIG. 5B. In this case, the scheduling is started assuming that TPX=TP3 in S11, and TPX=TP3 is maintained during the processing of S12 to S14. Then, TPX is changed from TP3 to TP1 in S15, and TP1 remains unchanged during the processing of S15 to S21. When it is determined that the running status (data input and output) related to TP3 is normal in S18, TPX=TP2 is satisfied (that is, the scheduling pattern is switched to the normal control scheduling pattern starting from TP2) in S24. Meanwhile, when it is determined that the running status (data input and output) related to TP3 is abnormal in S18, TPX=TP3 is satisfied in S23 (that is, the safety control scheduling pattern starting from TP3 is continued).

The above example illustrates the case where only the three TPs (TP1 for safety monitoring, TP2 for normal control, and TP3 for safety control) are combined as the scheduling pattern, but a plurality of partitions TP2 for normal control and a plurality of partitions TP3 for safety control may be present. For example, scheduling patterns may be formed by a combination of five TPs (TP1 to TP5) including two TPs of TP2 and TP4 for normal control, TP1 for safety monitoring, and two TPs of TP3 and TP5 for safety control. In this case, in S23, the partition scheduler 21 may determine the type of the abnormality state of the running status (data input and output) related to TPX, and may select one of TP3 and TP5 for safety control according to the abnormality type. Further, in S24, one of TP2 and TP4 for normal control may be selected.

As described above, in this embodiment, the OS 100 includes the partition scheduler 21 for selecting and deciding a partition to be subsequently activated in response to the notification from TP1 for safety monitoring or the notification from each TP. The partition scheduler 21 operates in the predetermined timer period independently from the tasks executed in each TP. The partition scheduler 21 which operates independently in the predetermined timer period includes a partition scheduling function, which provides the following effects.

First, in general, there is a demand for shortening the execution time of the safety monitoring task 24 as much as possible in order to sufficiently ensure the execution time of the normal control task 26. In a related art (for example, Patent Literature 1), the safety monitoring task 24 performs not only monitoring of the running status of the normal control task 26 and monitoring of the input and output data to and from the I/O port 12, but also selection and decision of the scheduling pattern. Therefore, it is necessary to allocate the execution time required for the selection and decision to TP2 to which the safety monitoring task 24 belongs.

In order to guarantee the ensuring of functional safety, it is basically necessary to alternately execute the safety monitoring task 24 and the normal control task 26. For this reason, in the related art, the selection and decision of the scheduling pattern by the safety monitoring task 24 are also executed every time upon execution of the normal control task 26. After a plurality of cycles in total, a lot of execution time is required for the safety monitoring task 24 to select and decide the scheduling pattern.

On the other hand, according to this embodiment, it is not necessary for the safety monitoring task 24 itself to execute selection and decision of the scheduling pattern. Additionally, the execution time required for the partition scheduler 21 to select and decide the scheduling pattern is shortened. This provides an effect that a shorter period of time can be allocated to TP1 for safety monitoring and a longer period of time can be allocated to TP2 for normal control, as compared with the related art.

Furthermore, the processing illustrated in FIG. 6 has been described assuming that the partition scheduler 21 selects and decides TP3 for safety control (S23), or selects and decides TP2 for normal control (S24), according to the result notified from TP1, but the present invention is not limited thereto. For example, a configuration in which the running status result is notified to the partition scheduler 21 from each of TP1 to TP3 may be employed in place of the configuration in which the result is notified to the partition scheduler 21 only from TP1 for safety monitoring, and the partition scheduler 21 may select and decide TP3 for safety control according to the result notified from each TP.

When the partition scheduler 21 which operates independently from each TP employs a configuration for receiving the results notified from all TPs, the partition scheduler 21 can grasp the statuses related to all TPs in an integrated manner. Accordingly, for example, the partition scheduler 21 can execute judgment as to skipping or the like of the TP which need not be executed, in consideration of the status of each TP based on the result notified from each TP. This provides an effect that only the time partition which need not be executed can be intentionally skipped. Furthermore, for example, the partition scheduler 21 can decide and select the next partition only from TPs in the normal state in consideration of the status of each TP based on the result notified from TP1 for safety monitoring. Therefore, unlike the related art, the effect of achieving more accurate partition scheduling can be obtained.

Figure 7:
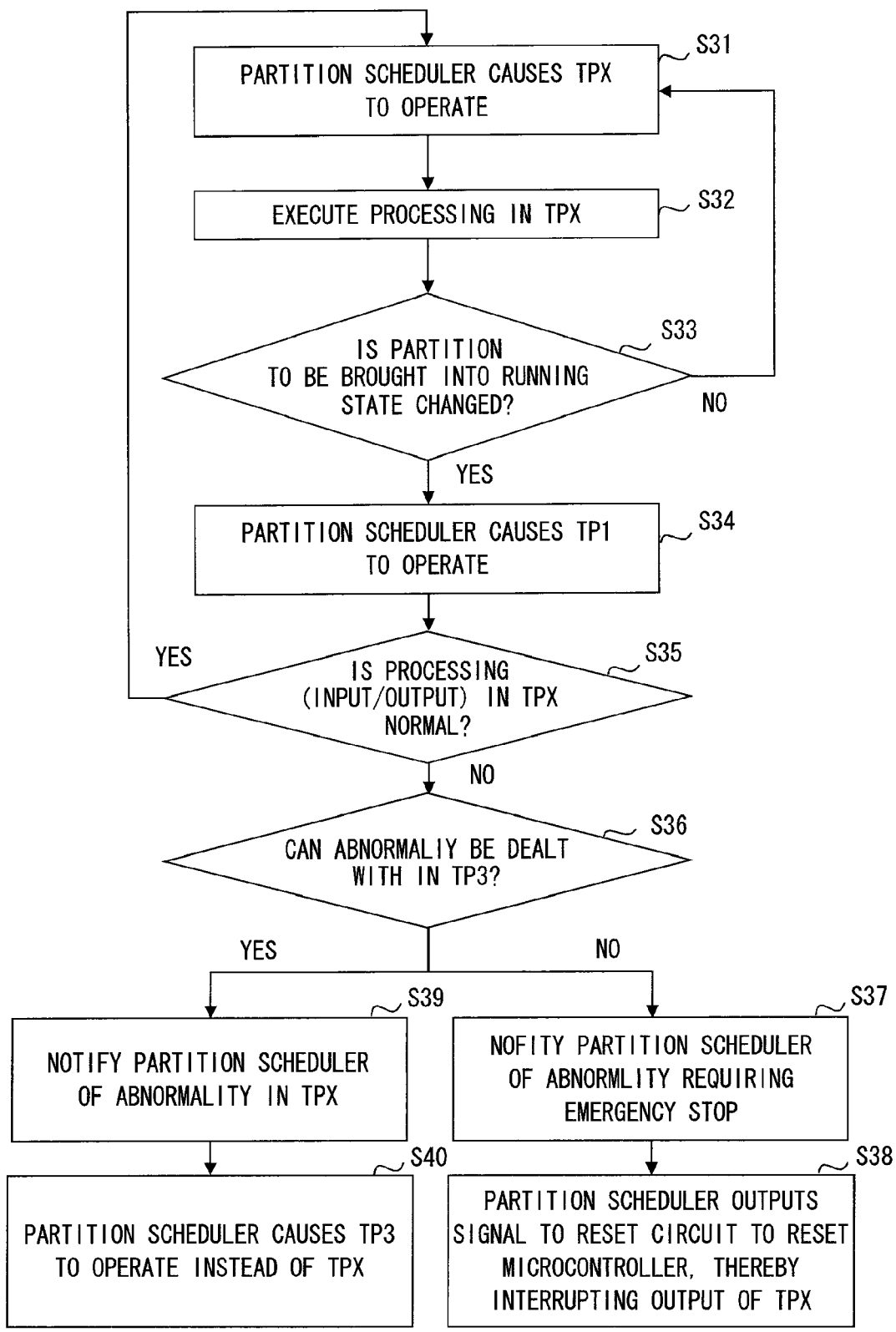
FIG. 7 is a flowchart showing a specific example of a reset procedure of a microcontroller.
Figure 8:
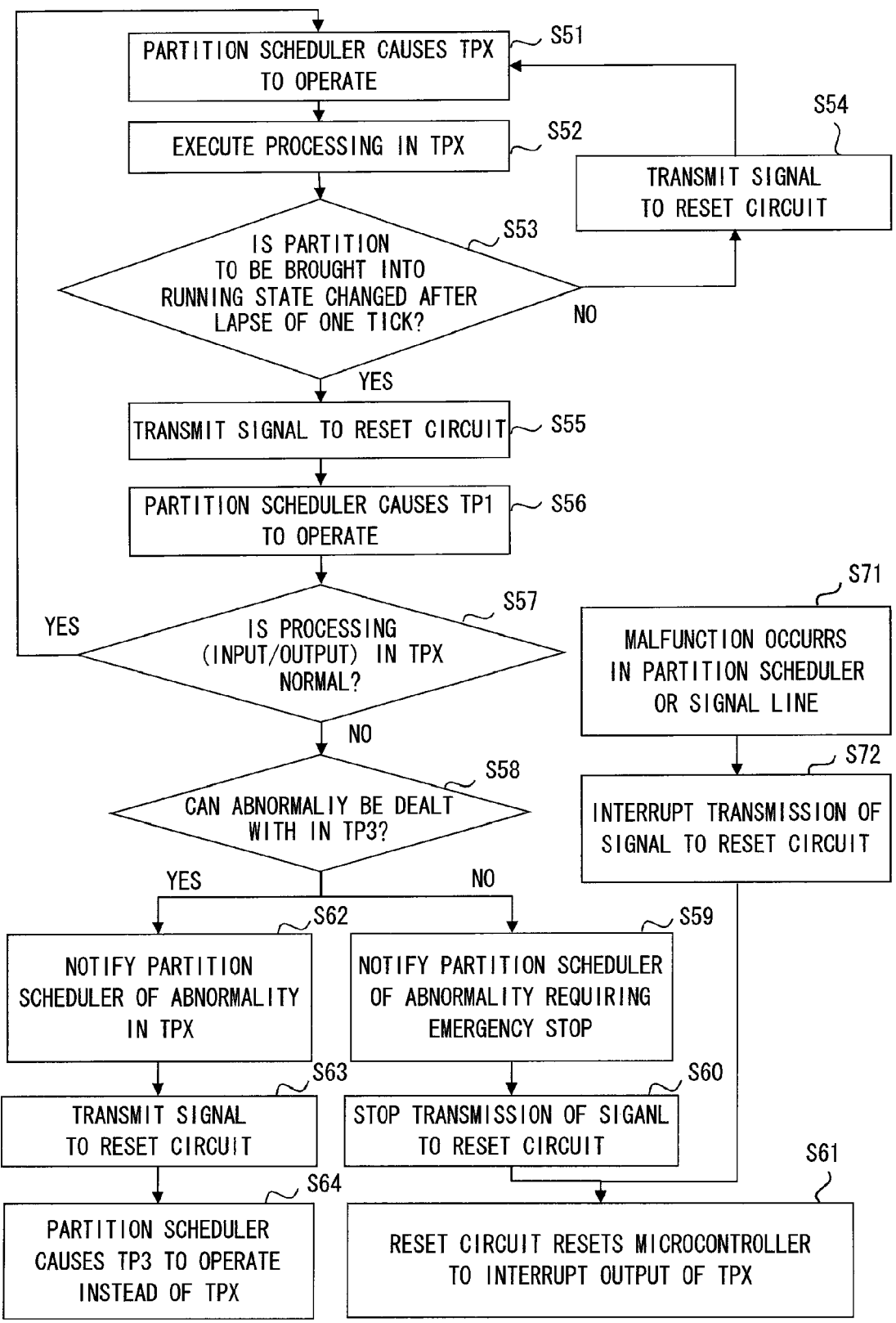
FIG. 8 is a flowchart showing a specific example of the reset procedure of the microcontroller.

Subsequently, the mechanism for resetting the microcontroller 15 using the reset circuit 14 will be described with reference to FIGS. 7 and 8. FIGS. 7 and 8 are flowcharts each showing a specific example of the reset procedure of the microcontroller 15 using the reset circuit 14.

In this embodiment, the partition scheduler 21 which operates every one tick has a function of resetting the microcontroller 15. Upon detecting an abnormality in the OS 100, the partition scheduler 21 takes a measure for the abnormality in conjunction with the reset circuit 14. The reset circuit 14 resets the microcontroller 15 based on the signal from the partition scheduler 21.

Referring first to FIG. 7, a specific example of the reset procedure of the microcontroller 15 using the reset circuit 14 will be described. In the processing shown in FIG. 7, upon receiving a reset instruction signal from the partition scheduler 21, the reset circuit 14 resets the microcontroller 15. Note that in FIG. 7, TPX is a TP other than TP1 and TP3.

First, in S31 to S33, the partition scheduler 21 starts operation of TPX, thereby executing processing related to TPX until the TP to be subsequently activated is changed. After the partition scheduler 21 starts operation of the task scheduler 23 in TP1 (S34), the safety monitoring task 24 belonging to TP1 judges whether the processing (input and output) related to TPX has been normal (S35). As a result of judgment, when the processing has been normal (Yes in S35), the flow returns to S31 to continue the operation for the same TPX.

As a result of judgment, when the processing has been abnormal (No in S35), the safety monitoring task 24 belonging to TP1 judges whether the abnormality in TPX is an abnormality that can be dealt with by the safety control task 28 belonging to TP3 (S36). When the abnormality is not an abnormality that can be dealt with in TP3 (No in S36), the safety monitoring task 24 belonging to TP1 notifies the partition scheduler 21 of the abnormality requiring emergency stop (S37). The partition scheduler 21 having received the notification from the safety monitoring task 24 belonging to TP1 outputs a reset instruction signal to the reset circuit 14, and the reset circuit 14 having received the reset instruction signal resets the microcontroller 15 (S38).

When the abnormality is an abnormality that can be dealt with in TP3 (Yes in S36), the safety monitoring task 24 belonging to TP1 notifies the partition scheduler 21 of the abnormality in TPX (S39). The partition scheduler 21 having received the notification from TP1 switches the time partition from TPX to TP3 (S40).

Referring next to FIG. 8, another specific example of the reset procedure of the microcontroller 15 using the reset circuit 14 will be described. In the processing shown in FIG. 8, the partition scheduler 21 periodically transmits signals to the reset circuit 14. Further, when the transmission of signals from the partition scheduler 21 is interrupted, the reset circuit 14 resets the microcontroller 15. Note that in FIG. 8, TPX is a TP other than TP1 and TP3.

In comparison with the processing of S31 to S35 shown in FIG. 7, it is clarified in S53 of FIG. 8 that the partition scheduler 21 operates every one tick, and there is a difference in that the partition scheduler 21 periodically transmits signals to the reset circuit 14 in S54 and S55. The other processing of S51 to S57 shown in FIG. 8 is basically the same as that of S31 to S35 shown in FIG. 7.

Further, in comparison with the processing of S36 to S40 shown in FIG. 7, there is a difference in that the partition scheduler 21 stops transmission of signals to the reset circuit 14 in S60 of FIG. 8, and that the partition scheduler 21 transmits signals to the reset circuit 14 in S63. There is another difference in that the reset circuit 14 resets the microcontroller 15 upon interruption of the transmission of signals from the partition scheduler 21 in S61 of FIG. 8. The other processing of S58 to S64 shown in FIG. 8 is basically the same as that of S36 to S40 shown in FIG. 7.

Moreover, as shown in S71 and S72 of FIG. 8, when a malfunction occurs in the partition scheduler 21, or when a malfunction occurs in a signal line from the partition scheduler 21 to the reset circuit 14, in parallel with the processing of S51 to S64, the transmission of signals from the partition scheduler 21 to the reset circuit 14 is interrupted. Also in this case, the reset circuit 14 resets the microcontroller 15 upon interruption of the transmission of signals from the partition scheduler 21 (S61).

According to the processing shown in FIG. 8, the microcontroller 15 can be reliably reset not only when the reset instruction is intentionally issued from the partition scheduler 21 to the reset circuit 14, but also when the partition scheduler 21 itself fails to operate normally due to some causes or when a malfunction occurs in a signal line for transmitting signals from the partition scheduler 21 to the reset circuit 14. At the same time, execution of normal switching of TPs every one tick can also be guaranteed.

Note that in FIGS. 7 and 8, the description has been made assuming that the partition scheduler 21 outputs the reset instruction signal to the reset circuit 14 or stops transmission of the signal to the reset circuit 14 in response to the notification of the result from TP1. Alternatively, the partition scheduler 21 may output the reset instruction signal to the reset circuit 14 or stop transmission of the signal to the reset circuit 14 in response to the notification of the result from any one of TP1 to TP3.

<Second Embodiment of the Invention>

A safety controller according to this embodiment is a modification of the safety controller 1 described above. The overall configuration of the safety controller according to this embodiment may be similar to the configuration of the safety controller 1 shown in FIG. 1. Additionally, a task execution environment provided by an OS included in the safety controller according to this embodiment may be configured in the same manner as that of the task execution environment shown in FIG. 4.

This embodiment is characterized in that when an abnormality requiring emergency measures occurs during execution of the normal control task 26, the normal control task 26 forcibly activates the partition scheduler 21 immediately upon occurrence of the abnormality, and the partition scheduler 21 switches the time partition to the time partition in which the safety control task 28 is executed. Note that examples of the abnormality requiring emergency measures include an abnormality that can cause inversion of a service robot, transportation equipment, or the like, and an abnormality that can cause fire due to a failure or heat generation.

Figure 9:
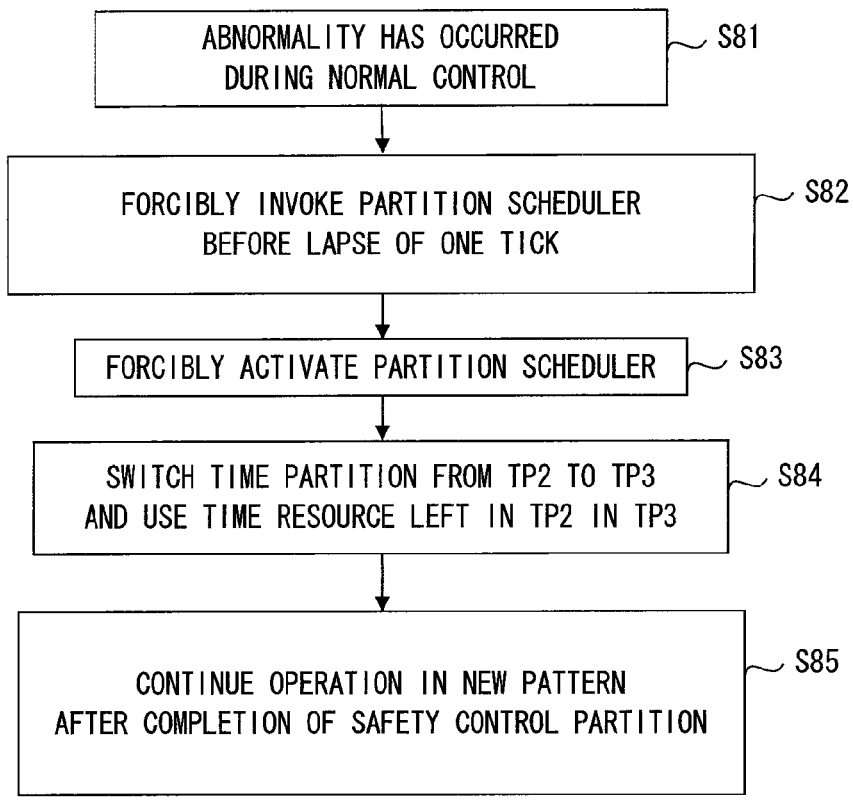
FIG. 9 is a flowchart showing a specific example of a procedure of the partition scheduler.
Figure 10:
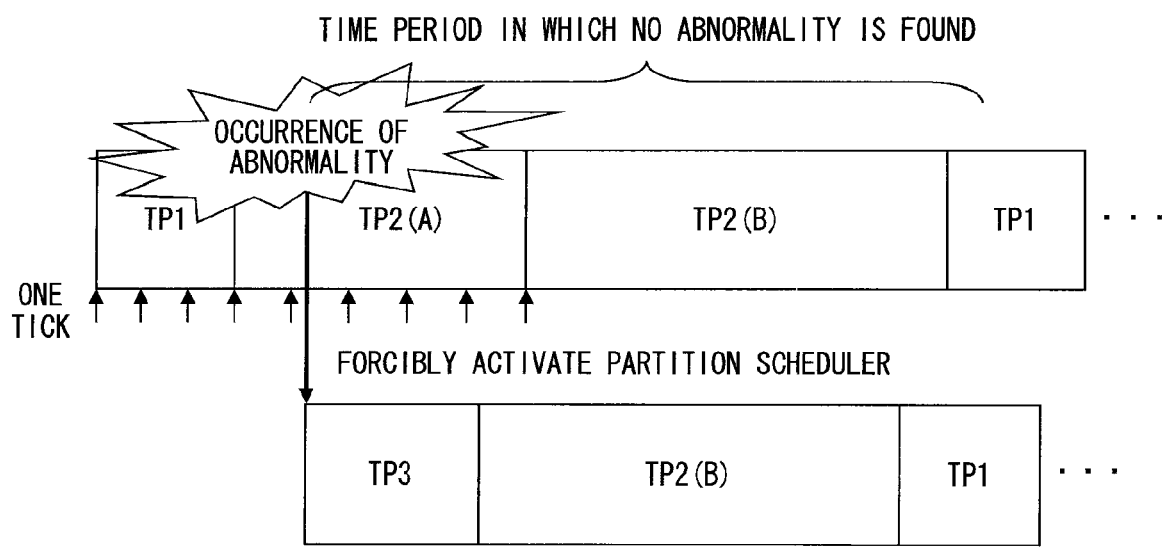
FIG. 10 is a specific example of switching of time partitions upon occurrence of an abnormality.

Referring next to FIGS. 9 and 10, the processing performed by the safety controller 1 according to this embodiment will be described in more detail. Note that in FIGS. 9 and 10, there may be a plurality of time partitions in which the normal control task 26 is executed.

FIG. 9 is a flowchart showing a specific example of a procedure of the partition scheduler.

First, if an abnormality has occurred during execution of the normal control task 26 in TP2 (S81), the normal control task 26 immediately invokes the partition scheduler 21 upon occurrence of the abnormality (S82). Specifically, upon detection of the occurrence of the abnormality of urgency, the normal control task 26 instructs the partition scheduler 21 to be activated. In response to the invocation from the normal control task 26, the partition scheduler 21 is forcibly activated (S82). Note that a system call of the OS 100 may be used, for example, as a configuration for the normal control task 26 to forcibly activate the partition scheduler 21.

The partition scheduler 21 switches the time partition from TP2 in which the normal control task 26 has been executed to TP3 in which the safety control task 28 is to be executed (S84). When the time partition is switched to TP3, the safety control task 28 belonging to TP3 is executed. As a result, the remaining time resource in the time resource originally allocated to TP2 is utilized for execution of the safety control task 28.

When the processing by the safety control task 28 is completed, the partition scheduler 21 newly starts partition scheduling in accordance with the scheduling pattern (S85). Here, when the processing by the safety control task 28 is completed, for example, the safety control task 28 notifies the partition scheduler 21 of the completion of the processing, thereby enabling the partition scheduler 21 to judge whether the processing by the safety control task 28 is completed. When the processing by the safety control task 28 is completed, the partition scheduler 21 may switch the time partition to a new time partition in accordance with the scheduling pattern, or may switch the time partition to be returned to the time partition scheduled to follow TP2, regarding TP2 executed prior to switching to TP3 in S84.

FIG. 10 is a diagram showing a specific example of switching of time partitions upon occurrence of an abnormality. Note that in FIG. 10, a case where two time partitions (TP2(A) and TP2(B)) for normal control are present will be described by way of example.

Referring first to the upper figure of FIG. 10, upon occurrence of an abnormality in TP2(A), the running normal control task 26 immediately invokes the partition scheduler 21. Then, as illustrated in the lower figure of FIG. 10, the partition scheduler 21 is forcibly activated in response to the invocation from the normal control task 26, and the partition scheduler 21 switches the safety control task 28 to TP3. Further, when the safety control task 28 is executed and completed, the partition scheduler 21 performs time scheduling for switching the time partition to TP2(B). Thus, according to this embodiment, measures for the abnormality can be taken rapidly upon occurrence of an abnormality.

<Third Embodiment of the Invention>

This embodiment is a modification of the safety controller 1 according to the second embodiment described above. Accordingly, description of the same components as those of the second embodiment described above is omitted, and components different from those of the second embodiment will be mainly described below.

According to the second embodiment described above, the scheduling pattern is forcibly switched to the time partition in which the safety control task 28 is executed, in the middle of the time partition in which the normal control task 26 is being executed. Accordingly, the reactivity to the occurrence of an abnormality is high, but there is a possibility that a deviation occurs in the switching timing of the time partition in the subsequent scheduling. As illustrated in the lower figure of FIG. 10, for example, as a result of switching to TP3 in the middle of the partition TP2, the timing of the control executed by the normal control task 26 may be deviated from the scheduled timing in the TP2(B). As a result, the control by the device may become unstable (that is, there is a trade-off relation between the reactivity and instability).

Accordingly, this embodiment is characterized in that when an abnormality requiring emergency measures occurs during execution of the normal control task 26, instead of forcibly activating the partition scheduler 21 immediately upon occurrence of the abnormality, the partition scheduler 21 switches the time partition to the time partition in which the safety control task 28 is executed, at the subsequent timing after a lapse of one tick, after checking whether there is enough time resource to execute the safety control task 28 in the same time partition.

Figure 11:
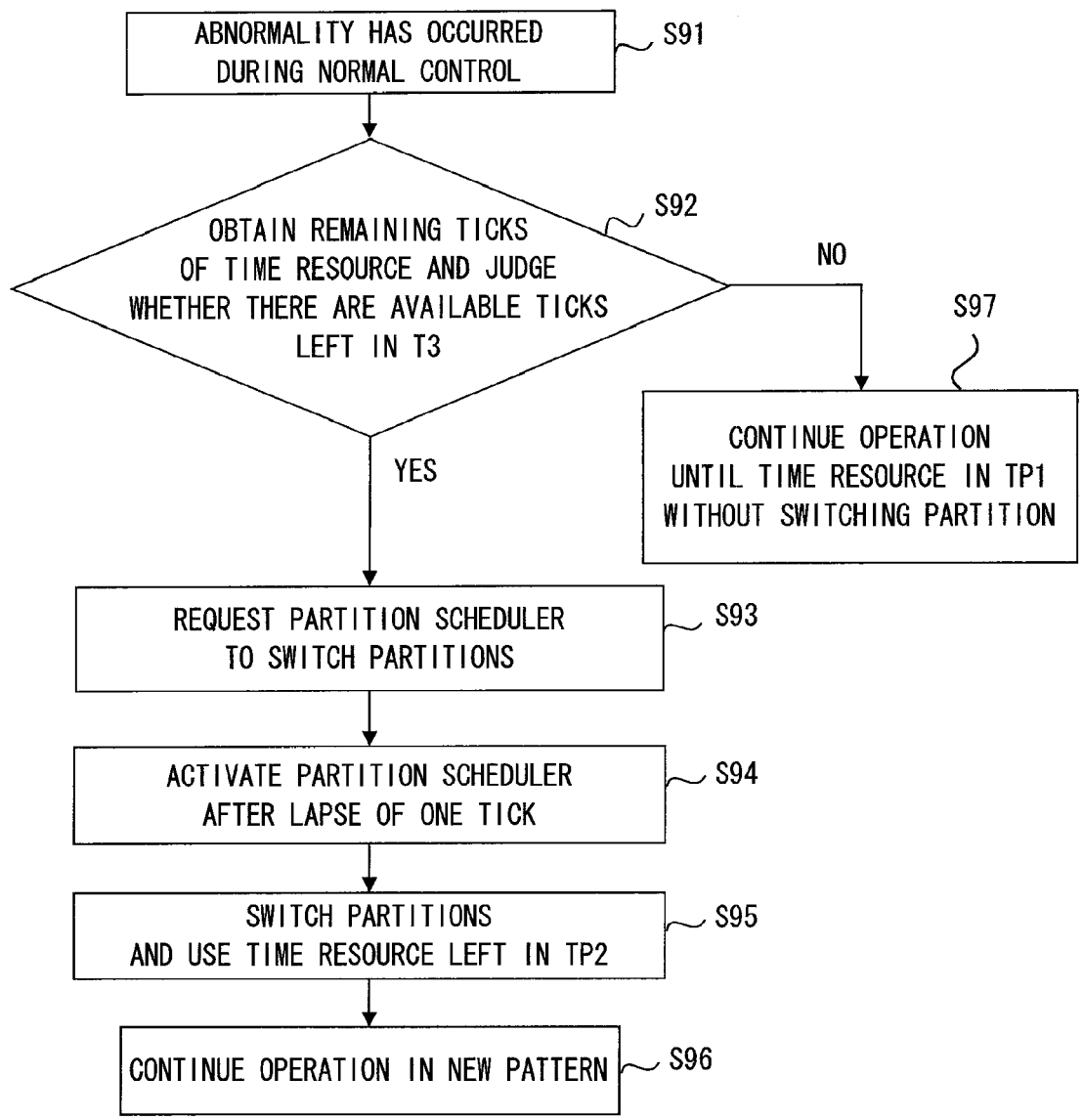
FIG. 11 is a flowchart showing a specific example of a procedure of the partition scheduler.
Figure 12:
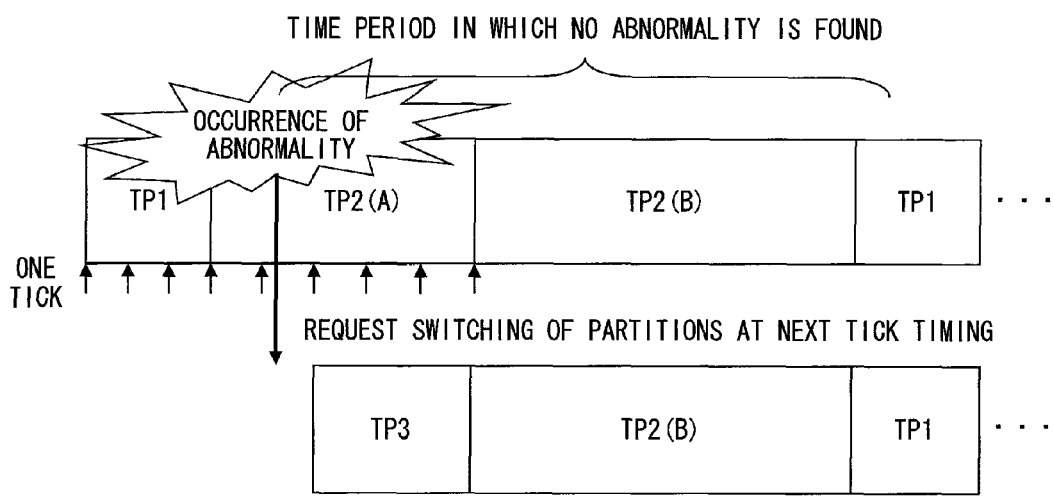
FIG. 12 is a specific example of switching of time partitions upon occurrence of an abnormality.

Referring next to FIGS. 11 and 12, the processing by the safety controller 1 according to this embodiment will be described in more detail below. Note that in FIGS. 11 and 12, a plurality of time partitions in which the normal control task 26 is executed may be present.

FIG. 11 is a flowchart showing a specific example of a procedure of the partition scheduler. Referring to FIG. 11, a case where an abnormality occurs in TP2 during execution of the partition scheduling according to the normal control scheduling pattern (for example, FIG. 5A) will be described by way of example.

First, if an abnormality has occurred during execution of the normal control task 26 in TP2 (S91), the normal control task 26 obtains a time resource left in the time resource allocated to TP2, and judges whether a time resource available for the execution of the safety control task 28 is left (S92). As a configuration for judging whether a time resource is left, it is possible to employ a technique for judging the remaining time resource based on the total number of ticks allocated to the time partition, the number of execution ticks necessary for execution of each task, and the number of elapsed ticks from the start time of the partition, for example. Specifically, information indicative of the total number of ticks allocated to the time partition and the number of execution ticks necessary for execution of each task is preliminarily stored in the execution memory 11. Further, the partition scheduler 21 counts the number of elapsed ticks from the start time of the partition. Further, each task sends an inquiry to the partition scheduler 21 about the total number of ticks and the number of elapsed ticks, and subtracts the number of elapsed ticks from the total number of ticks, thereby making it possible to calculate the number of remaining ticks within the same time partition. Thus, it is possible to judge whether a time resource is left, based on whether the number of ticks obtained by the subtraction exceeds the number of execution ticks. In this embodiment, the normal control task 26 judges whether one or more ticks are left as the remaining time resource in TP2.

When a time resource available in TP3 is left (YES in S92), the normal control task 28 notifies the partition scheduler 21 of a switching request to switch the time partition at a subsequent timing after a lapse of one tick (S93). The partition scheduler 21 is activated after a lapse of one tick (S94), and the safety control task 28 switches the time partition from TP2 in which the normal control task has been executed to TP3 in which the safety control task 28 is to be executed, in response to the switching request from the normal control task 26 (S95). The safety control task 28 belonging to TP3 is executed upon switching of the time partition to TP3.

When the processing by the safety control task 28 is completed, the partition scheduler 21 newly starts partition scheduling in accordance with the scheduling pattern (S96).

When there is no remaining time resource available in TP3 (No in S92), the execution of the normal control task 28 in TP2 is continued until the timing when the time partition is switched to TP1 subsequent to TP2, instead of notifying the partition scheduler 21 of the partition switching request.

FIG. 12 is a diagram showing a specific example of switching of time partitions upon occurrence of an abnormality. Note that in FIG. 12, a case where two time partitions (TP2(A) and TP2(B)) for normal control are present will be described by way of example.

Referring first to the upper figure of FIG. 12, upon occurrence of an abnormality in TP2(A), the running normal control task 26 requests the partition scheduler 21 to switch the time partition in consideration of the remaining time resource in TP2(A). Then, as illustrated in the lower figure of FIG. 12, the partition scheduler 21 activated in the next one tick switches the time partition to TP3 in which the safety control task 28 is executed, in response to the request from the normal control task 26. Then, the partition scheduler 21 performs time scheduling to switch the time partition to TP2(A), when the safety control task 28 is executed and completed. In this manner, there is no need to change the start timing of the time partition regarding TP2(B), so that the instability due to a deviation of the control period with respect to the normal control task 26 to be executed in TP2(B) can be avoided.

Thus, according to this embodiment, upon occurrence of an abnormality, measures for the abnormality can be taken rapidly. Moreover, according to this embodiment, upon occurrence of an abnormality, since switching from TP2 to TP3 is carried out at a tick timing, the stability can be maintained, while the reactivity is lowered compared to the second embodiment.

<Fourth Embodiment of the Invention>

A safety controller according to this embodiment is a modification of the safety controller 1 described above. The overall configuration of the safety controller according to this embodiment may be similar to the configuration of the safety controller 1 shown in FIG. 1. Additionally, a task execution environment provided by an OS included in the safety controller according to this embodiment may be configured in the same manner as that of the task execution environment shown in FIG. 4.

In the first embodiment, the OS 100 includes the partition scheduler 21 and the task schedulers 23, 25, and 27 in the respective time partitions. The partition scheduler 21 can execute management of time partitions and resource partitions. However, the partition scheduler 21 has no grasp on whether tasks are normally switched by the task scheduler in each partition. When a plurality of safety monitoring tasks 24 are present, some of the safety monitoring tasks 24 may not be executed and a monitoring omission may occur. Accordingly, the partition scheduler 21 is required to be able to grasp the number of times of switching tasks in each time partition, and to prevent a monitoring omission relating to the safety monitoring task 24.

In this embodiment, the number of times of switching tasks is stored by the task scheduler in each time partition. Further, upon switching of time partitions, the partition scheduler 21 refers to the number of times of switching tasks stored by the task scheduler, and judges the running status of tasks in each time partition based on whether or not the number of times of switching reaches a prescribed number of times. This enables the partition scheduler 21 to manage time partitions and resource partitions, enables the task schedulers 23, 25, and 27 in the respective time partitions to execute tasks, and enables the partition scheduler 21 to grasp whether tasks are normally switched by the task scheduler. Note that this embodiment is suitably applied to the safety controller 1, which is mounted in a service robot or the like, for a service robot or the like in which tasks are switched at high speed, or for a service robot or the like in which the number of tasks is large.

Figure 13:
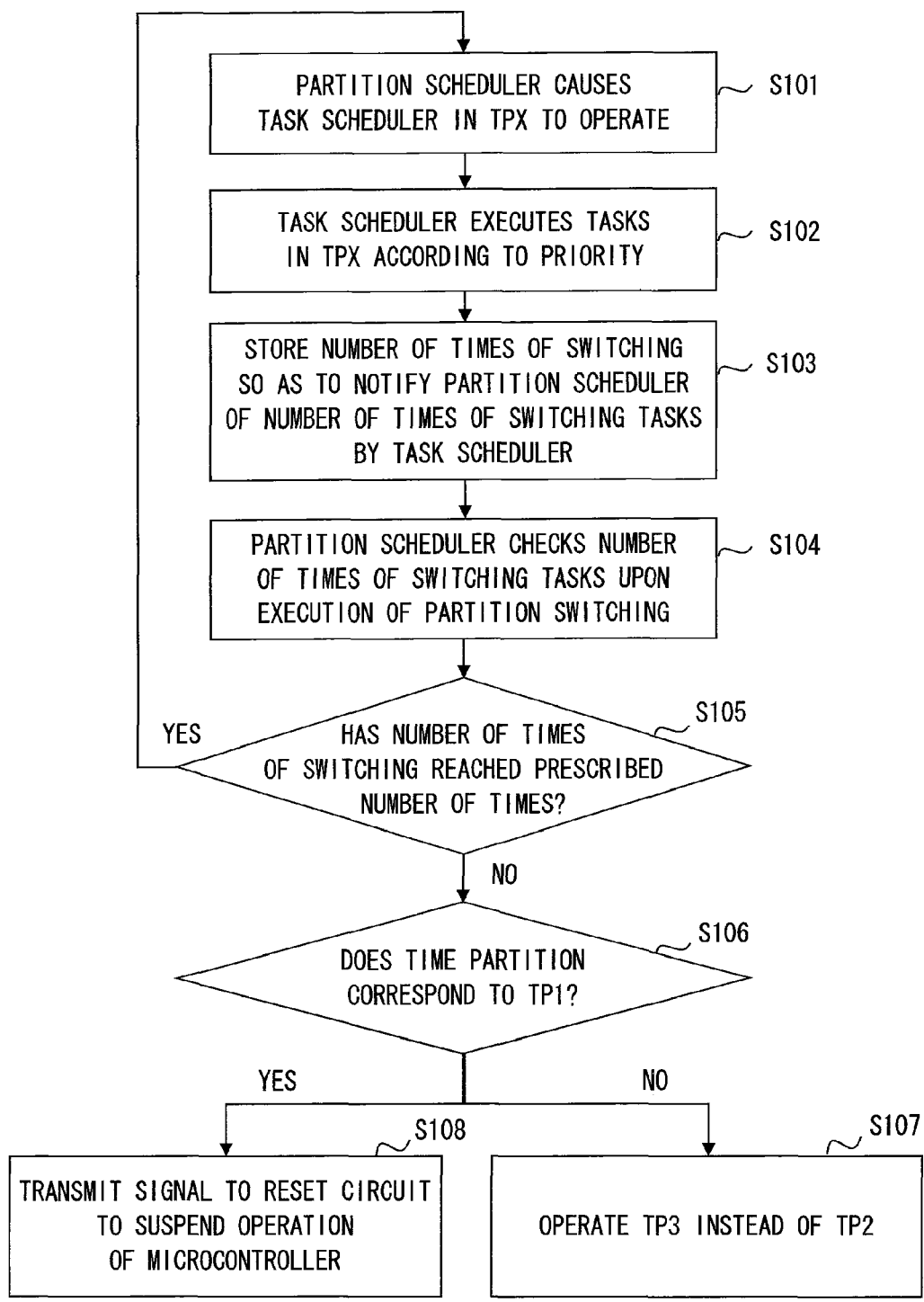
FIG. 13 is a flowchart showing a specific example of a procedure of the partition scheduler.

Referring next to FIG. 13, the processing by the safety controller 1 according to this embodiment will be described in more detail. In FIG. 13, a plurality of time partitions in which the normal control task 26 is executed may be present.

FIG. 13 is a flowchart showing a specific example of a procedure of the partition scheduler. Referring to FIG. 13, a case where the partition scheduling is executed according to the normal control scheduling pattern (for example, FIG. 5A) will be described. Assume that TPX is one of TP1 and TP2.

First, the partition scheduler 21 causes the task scheduler in TPX to operate (S101). The task scheduler executes tasks according to priority (S102). The task scheduler counts the number of switching times indicating the number of times of switching tasks, for the executed tasks, and stores the counted number in the execution memory 11 (S103).

The partition scheduler 21 checks the number of times of switching tasks stored in S103, when partition switching is to be carried out (S104). The partition scheduler 21 judges whether the number of times of switching tasks reaches the prescribed number of times (S105). When the prescribed number of times is reached (Yes in S105), the partition scheduler 21 returns to S101 to continue processing without switching the partition. Note that an appropriate value is preliminarily set by a user as the prescribed number of times of switching tasks.

When the number of switching tasks does not reach the prescribed number of times (No in S105), the partition scheduler 21 judges whether the time partition in which the task is executed corresponds to TP2 in which the safety monitoring task 24 is to be executed (S106). When the time partition is not TP2 (No in S106), the partition scheduler 21 switches the time partition to TP3 (S107). When the time partition is TP2 (Yes in S106), the partition scheduler 21 causes the reset circuit 14 to operate so as to suspend the operation of the microcontroller 15 (S108).

FIG. 13 illustrates the case where TPX is one of TP1 and TP2. However, also when TPX corresponds to TP3 and the number of times of switching tasks in TP3 does not reach the prescribed number of times, the partition scheduler 21 may cause the reset circuit 14 to operate so as to suspend the operation of the microcontroller 15.

According to this embodiment described above, the partition scheduler 21 can grasp the number of times of switching tasks in each time partition, thereby making it possible to carry out appropriate partition switching according to the number of times of switching. Furthermore, a monitoring omission related to the safety monitoring task 24 can be prevented.

<Fifth Embodiment of the Invention>

A safety controller according to this embodiment is a modification of the safety controller 1 described above. The overall configuration of the safety controller according to this embodiment may be similar to the configuration of the safety controller 1 shown in FIG. 1. Additionally, a task execution environment provided by an OS included in the safety controller according to this embodiment may be configured in the same manner as that of the task execution environment shown in FIG. 4.

In this embodiment, one cycle of time partitions includes a plurality of time partitions, and a time is allocated to each of the plurality of time partitions. This embodiment is characterized in that during scheduling of time partitions and tasks, the partition scheduler 21 first retrieves tasks according to priority, and decides a task to be subsequently executed in consideration of a remaining time resource in the time partitions in which each task is executed.

Figure 14:
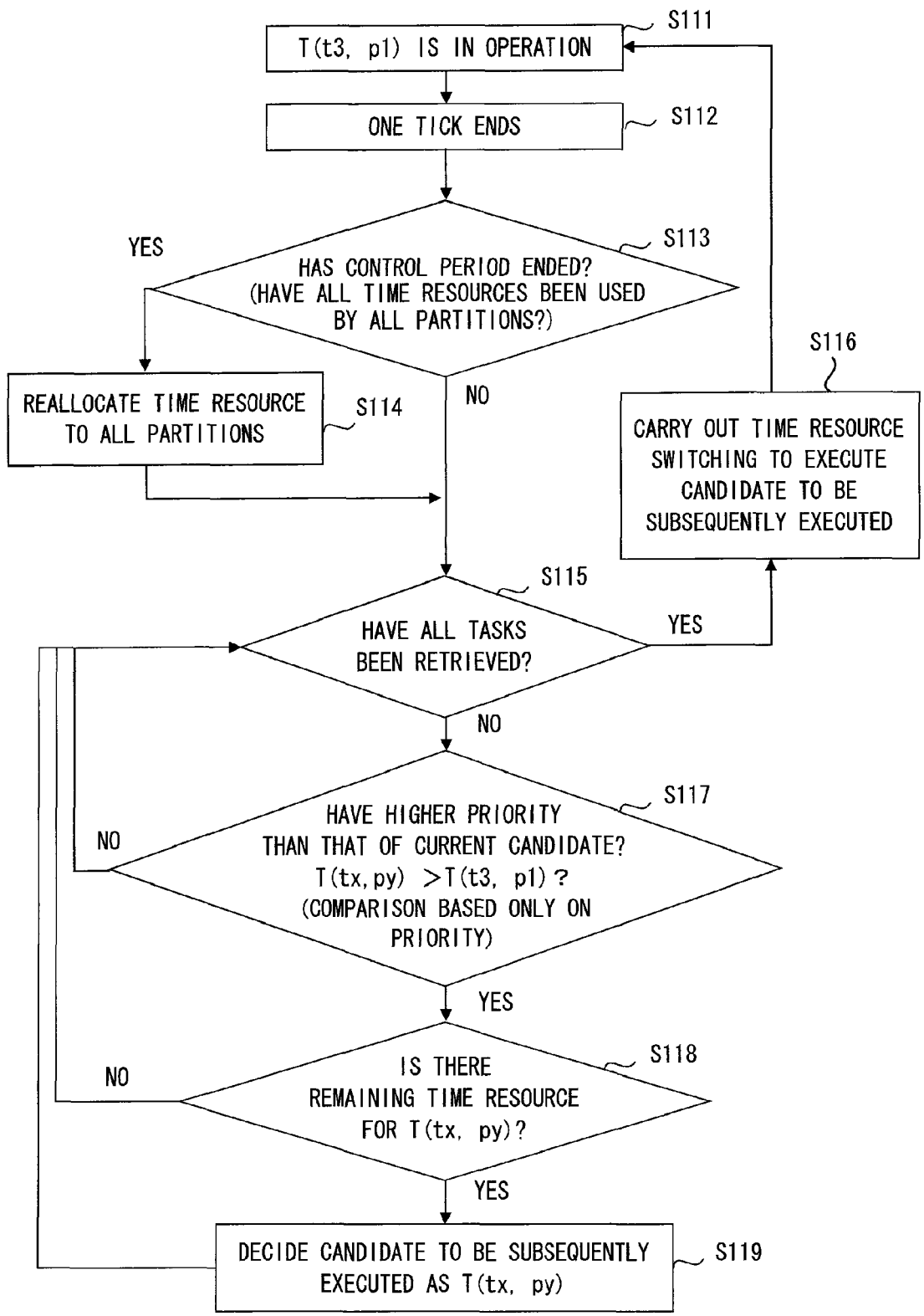
FIG. 14 is a flowchart showing a specific example of a procedure of the partition scheduler.

Referring next to FIG. 14, the processing performed by the safety controller 1 according to this embodiment will be described in more detail. FIG. 14 is a flowchart showing a specific example of a procedure of the partition scheduler. Note that in FIG. 14, T(tx, py) represents a task "py" to be executed in a time partition "tx". Referring to FIG. 14, a case where time partitions and tasks included in the subsequent cycle are scheduled assuming that Task 3 in TP1 is being executed (S111) will be described by way of example. FIG. 14 illustrates the processing being activated by the partition scheduler 21.

First, after an elapse of one tick (S112), the partition scheduler 21 judges whether the control period has ended (S113). Specifically, the partition scheduler 21 judges whether all the time resources allocated to the all the time partitions included in one cycle have been used up. For example, when two time partitions of TP1 and TP2 are included in one cycle, and when 10 ticks are allocated to TP1 and 20 ticks are allocated to TP2, the partition scheduler 21 judges whether 10 ticks have elapsed for execution of TP1 and 20 ticks have elapsed for execution of TP2. If the control period has ended (Yes in S113), the partition scheduler 21 reallocates time resources to all the time partitions (S114).

The partition scheduler S115 performs scheduling for the subsequent one cycle, and thus judges whether the retrieval of all tasks included in the subsequent one cycle has been finished (S115). If the retrieval of all tasks has not been finished (No in S115), the partition scheduler 21 judges whether each retrieved task has a priority higher than that of the current candidate task (S117). In FIG. 14, assuming that the retrieved task is represented by T(tx, py), it is judged whether the task has a priority higher than the current candidate task T(t3, p1).

When the priority of the retrieved task T(tx, py) is higher than the priority of the current candidate task (Yes in S118), the partition scheduler 21 judges whether there is a remaining time resource in each time partition in which the retrieved task T(tx, py) is executed (S118).

When there is a remaining time resource in the time partitions for the task T(tx, py) (Yes in S118), the partition scheduler 21 decides a task candidate to be subsequently executed as T(tx, py) (S119). Thus, in the processing of S115 to S119, when there is a remaining time resource in the time partition having the highest priority and belonging to the task, the task is decided as a task to be subsequently executed.

If the retrieval of all tasks has been finished (Yes in S115), the partition scheduler 21 switches the time partition to the time partition including the task so that the task decided in S119 is executed (S116). In S111, the subsequent processing is repeated assuming that the task decided in S119 is being executed.

Figure 15A:
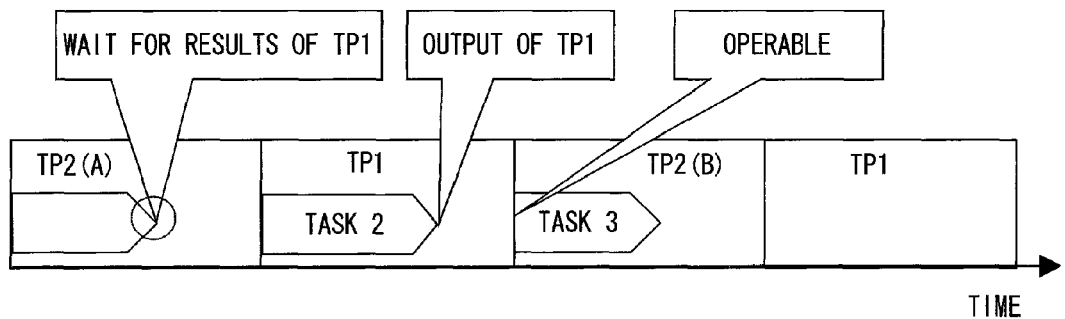
FIG. 15A is a diagram for explaining a scheduling result according to a related art.
Figure 15B:
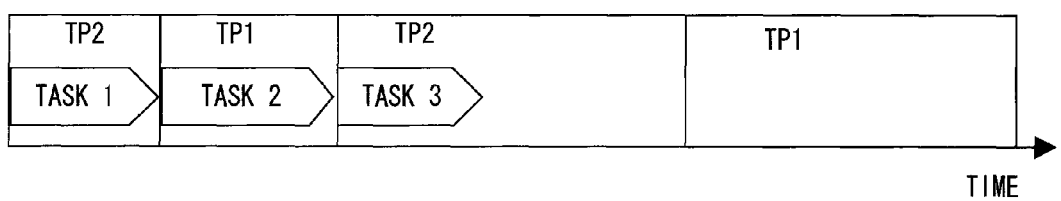
FIG. 15B is a diagram for explaining a scheduling result according to the present invention.

Referring next to FIGS. 15A and 15B, differences between results obtained by the scheduling method according to the related art (FIG. 15A) and results obtained by the scheduling method according to this embodiment (FIG. 15B) will be described. Note that in FIGS. 15A and 16B, a case where two types of time partitions TP1 and TP2 are included and the former half of TP2 corresponds to TP2(A) and the latter half thereof corresponds to TP2(B) will be described by way of example. Tasks included in TP2(A), TP1, and TP2(B) are respectively defined as Task 1, Task 2, and Task 3. These tasks are defined such that the priority of Task 1 is highest; the priority of Task 2 is second highest; and the priority of Task 3 is lowest.

As shown in FIG. 15A, according to the scheduling method of the related art, a fixed time is allocated to each time partition, and tasks are arranged according to priority. Accordingly, also when Task 1 is executed and completed in TP2 (A) as a result of scheduling, for example, the subsequent TP1 cannot be started immediately thereafter (that is, Task 2 having the second highest priority cannot be stated immediately after completion of the execution of Task 1).

On the contrary, as shown in FIG. 15B, according to the scheduling method of this embodiment, instead of arranging tasks in the time partitions to each of which a fixed time is allocated, tasks are first retrieved according to priority, and each task to be subsequently executed is decided in consideration of the time resource remaining in the time partitions in which each task is executed. As a result, the tasks can be arranged according to priority and the subsequent task can be executed immediately thereafter, while maintaining the ratio of the execution time allocated to each time partition to the entire one cycle. Therefore, the scheduling that can satisfy the priority and periodicity of each task can be achieved in consideration of the time allocated to each time partition.

<Sixth Embodiment of the Invention>

This embodiment is a modification of the safety controller 1 according to the fifth embodiment described above. Accordingly, description of the same components as those of the fifth embodiment described above is omitted, and components different from those of the second embodiment will be mainly described below.

In the fifth embodiment described above, in the retrieval of tasks, tasks are retrieved first based on the priority. This embodiment is characterized in that tasks are retrieved based on the number of time partitions, because the number of tasks is greater than the number of time partitions ((the number of tasks)>(the number of time partitions)). This enables retrieval of tasks more efficiently.

In this embodiment, during scheduling of time partitions and tasks, time partitions with a remaining time resource is first retrieved, and a task to be subsequently executed is decided according to the priority of the tasks in the retrieved time partitions.

Figure 16:
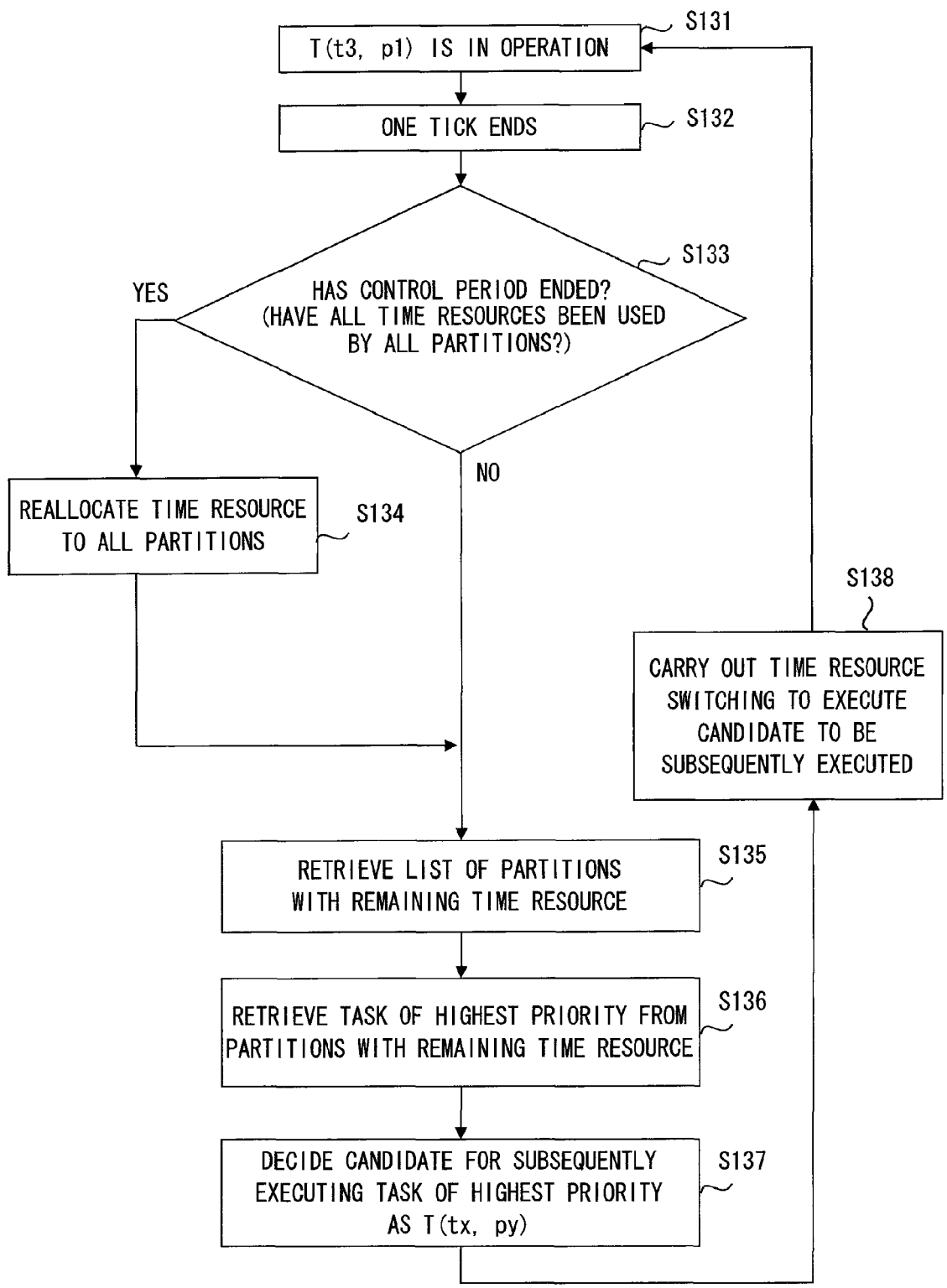
FIG. 16 is a flowchart showing a specific example of a procedure of the partition scheduler.
Figure 17:
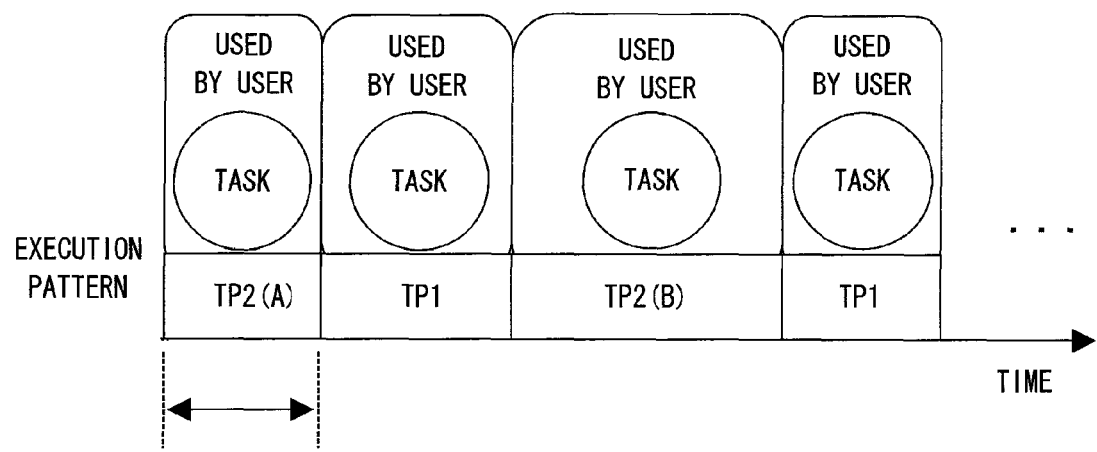
FIG. 17 is a diagram for explaining a second problem of the present invention.

Referring next to FIG. 16, the processing performed by the safety controller 1 according to this embodiment will be described in detail. FIG. 16 is a flowchart showing a specific example of a procedure of the partition scheduler. The processing of steps S131 to S134 and S138 shown in FIG. 16 is similar to the processing of steps S111 to S114 and S1116 shown in FIG. 14. Accordingly, the processing (S135 to S137 shown in FIG. 16) which is different from the processing shown in FIG. 14 will be mainly described below. FIG. 16 illustrates the processing being activated by the partition scheduler 21.

The partition scheduler S115 retrieves a list of time partitions with a remaining time resource from all the time partitions included in the subsequent one cycle, so as to perform scheduling in the subsequent one cycle (S115).

In the time partitions with a remaining time resource, the partition scheduler S115 retrieves the task having the highest priority from the tasks included in these time partitions (S136). The partition scheduler 21 decides the task retrieved in S136 assuming that a task candidate to be subsequently executed is represented by T(tx, py) (S137). Thus, in the processing of S135 to S137, the task which belongs to the time partition with a remaining time resource and which has the highest priority is retrieved and decided as a task to be subsequently executed.

<Seventh Embodiment of the Invention>

Figure 18:
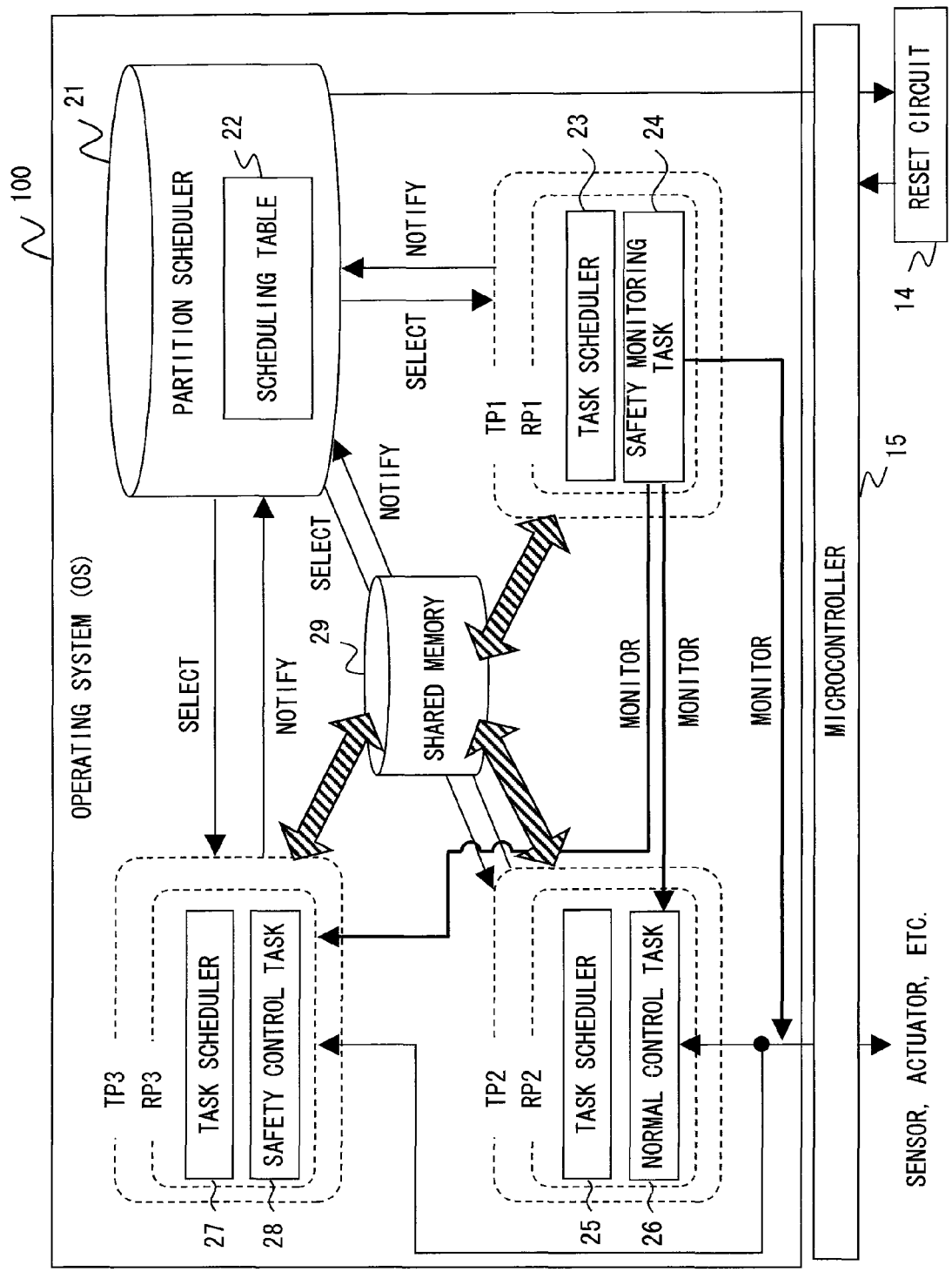
FIG. 18 is a diagram showing relationships between a partition scheduler and tasks according to a seventh embodiment of the invention.

A safety controller according to this embodiment is a modification of the safety controller 1 described above. The overall configuration of the safety controller according to this embodiment may be similar to the configuration of the safety controller 1 shown in FIG. 1. FIG. 18 is a conceptual diagram showing a task execution environment provided by an OS included in the safety controller according to this embodiment. In this embodiment, the OS 100 provides inter-task communication for exchanging data among the safety monitoring task 24, the normal control task 26, and the safety control task 28.

In the example shown in FIG. 18, a shared memory 29 is provided for data communication among the safety monitoring task 24, the normal control task 26, and the safety control task 28. For example, the safety monitoring task 24 of this embodiment takes over control information relating to a control target (a service robot, transportation equipment, or the like) from the normal control task 26 through the shared memory 29. Then, the safety control task 28 starts a safety control of the control target based on the taken-over control information. The safety control task 28 takes over the control information in this manner upon switching to the safety control, thereby making it possible to smoothly start the safety control of the control target.

In this embodiment, the shared memory 29 is divided into a plurality of inter-partition shared memories. Herein, the shared memory 29 is divided into a number of inter-partition shared memories corresponding to the number of time partitions that require data sharing. When the tasks in the time partitions access the inter-partition shared memories, access destinations are varied, and an inter-partition shared memory into which data is written and an inter-partition shared memory from which data is read out are changed every access. The operation in which a task reads out data is characterized in that data is read from an inter-partition shared memory in which latest updated data is stored.

Figure 19A:
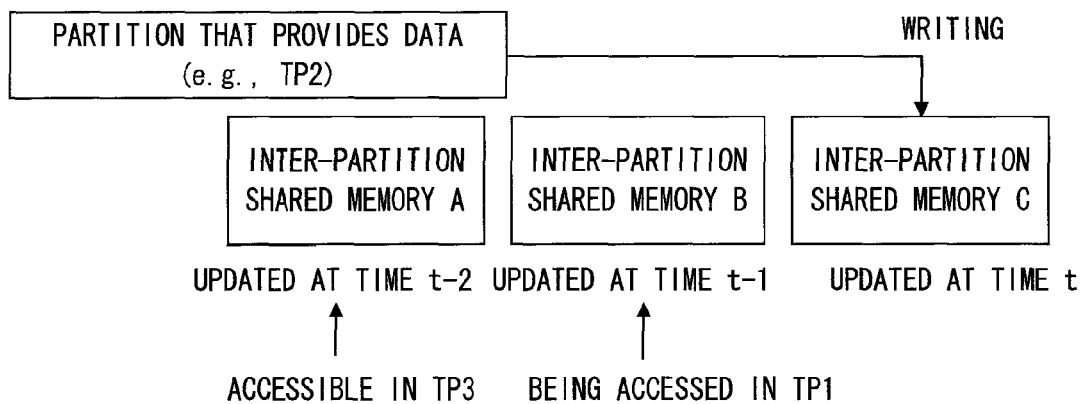
FIG. 19A is a diagram showing a specific example of access to inter-partition shared memories.
Figure 19B:
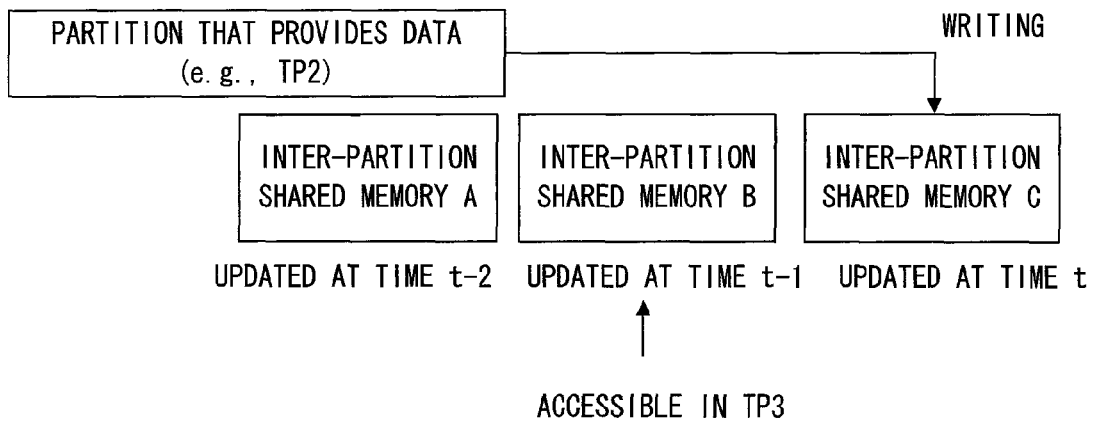
FIG. 19B is a diagram showing a specific example of access to the inter-partition shared memories.
Figure 20:
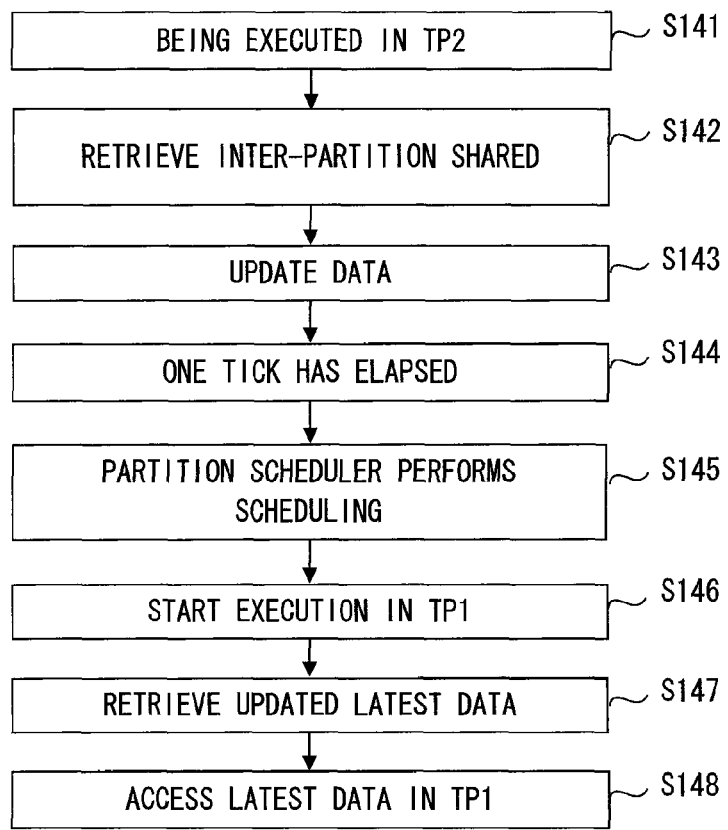
FIG. 20 is a flowchart showing a specific example of a procedure of access to the inter-partition shared memories.
Figure 21:
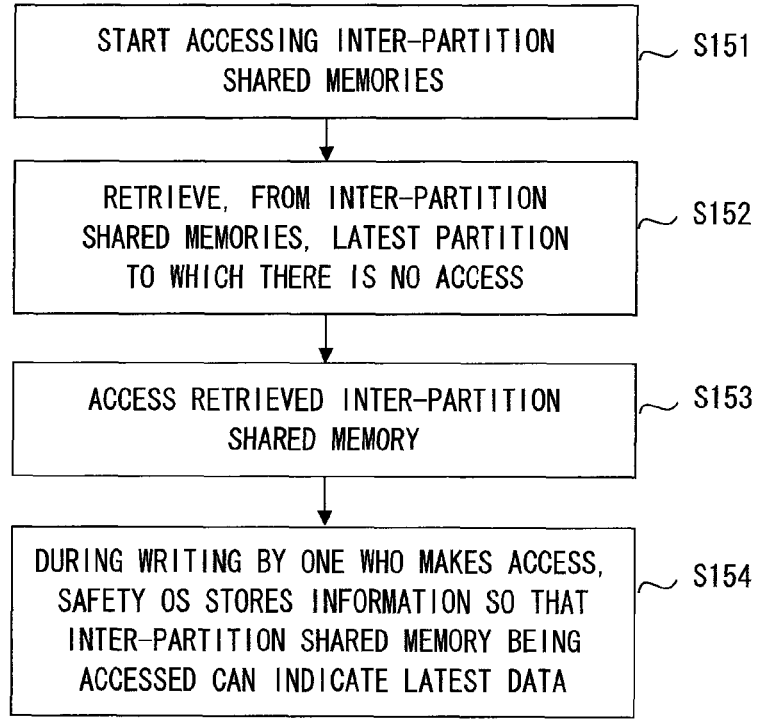
FIG. 21 is a flowchart showing a specific example of a procedure of access to the inter-partition shared memories.

Referring to FIGS. 19 to 21, the processing performed by the safety controller 1 according to this embodiment will be described in detail.

FIGS. 19A and 19B are diagrams each showing a specific example of access to the inter-partition shared memories. Note that in the figures, a case where three inter-partition shared memories A, B, and C are provided so as to respectively correspond to three time partitions (TP1, TP2, and TP3) will be described by way of example. The inter-partition shared memory A is already updated at a time t−2. The inter-partition shared memory B is already updated at a time t−1. The inter-partition shared memory C is being currently updated, and the update is completed at a time t.

As illustrated in FIG. 19A, the normal control task 26 in TP2 writes data into the inter-partition shared memory C. Meanwhile, there is no access to the safety monitoring task 24 in TP1, and the safety monitoring task 24 is accessing the inter-partition shared memory B in which the latest updated data is stored. In this case, the safety control task 28 in TP3 can access the inter-partition shared memory A. Further, as shown in FIG. 19B, when the access of the safety monitoring task 24 in TP1 is finished on time, there is no access to the safety control task 28 in TP3, and the safety control task 28 can start accessing the inter-partition shared memory B in which the latest updated data is stored.

FIG. 20 is a flowchart showing a specific example of a procedure of access to inter-partition shared memories. Referring to FIG. 20, a task scheduling pattern in which the time partition subsequent to TP2 corresponds to TP1 will be described by way of example.

First, during execution of the normal control task 26 in TP2 (S141), the OS 100 retrieves the inter-partition shared memory to which there is no access in any partition (S142).

The normal control task 26 in TP2 accesses the inter-partition shared memory specified by the OS 100 and updates data (S143). Even when the update by the normal control task 26 in TP2 is not completed, the task in the subsequent time partition accesses another inter-partition shared memory. Accordingly, the data update in S143 need not necessarily be completed.

After a lapse of one tick (S144), the partition scheduler 21 is activated to start the scheduling (S145). The time partition is switched to TP1, and the safety monitoring task 24 in TP1 starts execution (S146). The OS 100 retrieves the inter-partition shared memory which is not accessed by any task in any time partition and which stores the latest data in the updated inter-partition shared memory (S147).

The safety monitoring task 24 in TP1 accesses the inter-partition shared memory specified by the OS 100 (S148). Note that in S148, when TP1 accesses the inter-partition shared memory, switching from TP1 to another time partition may occur.

FIG. 21 is a flowchart showing a specific example of a procedure when data writing is carried out during access to an inter-partition shared memory.

First, a task in a time partition starts accessing the inter-partition shared memory (S151). The OS 100 is not accessed by any task in each time partition, and the inter-partition shared memory in which the latest data is stored is retrieved from among the updated inter-partition shared memories (S152).

The task in the time partition accesses the inter-partition shared memory retrieved in S152 (S153). When the task accessing the inter-partition shared memory executes writing data into the inter-partition shared memory, the OS 100 stores information on update of the inter-partition shared memory to indicate that the latest data is stored in the inter-partition shared memory during the current access (S154).

According to this embodiment described above, also when the task in any of the time partitions accesses the shared memory 29, a failure due to data sharing between time partitions can be avoided.

<Eighth Embodiment of the Invention>

A safety controller according to this embodiment is a modification of the safety controller 1 according to the seventh embodiment described above. Accordingly, description of the same components as those of the seventh embodiment described above is omitted, and components different from those of the seventh embodiment will be described below.

According to the seventh embodiment described above, also when a task in any of the time partitions accesses the shared memory 29, a failure due to data sharing between time partitions can be avoided. However, sharing of data, which needs to be shared, accurately (without omission) cannot be necessarily ensured. Accordingly, in the case of attempting to achieve a control of a service robot or the like by using the latest sensor data, for example, there is a possibility that the control is continued using outdated data.

According to the seventh embodiment described above, the inter-partition shared memory in which data is to be updated is basically changed every access. Accordingly, when a task in a time partition, which should not make access, accesses the inter-partition shared memory, it is highly likely that the data stored in the inter-partition shared memory is not the latest data.

Thus, this embodiment is characterized in that when a task in a time partition accesses an inter-partition shared memory, in addition to the processing described in the seventh embodiment, access from a task that should not make access is judged as an abnormality, and the corresponding processing is carried out.

Figure 22:
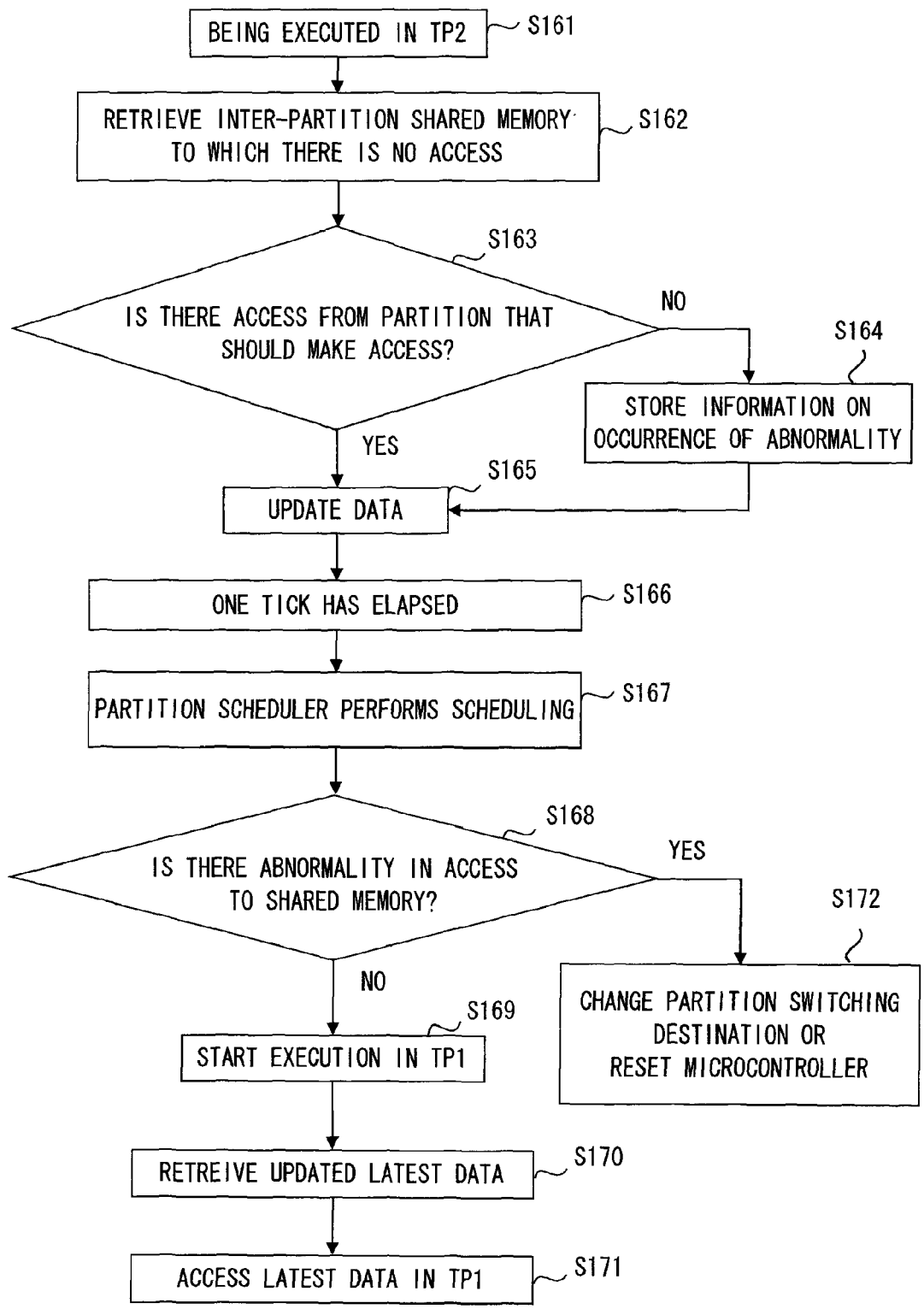
FIG. 22 is a flowchart showing a specific example of a procedure of access to the inter-partition shared memories.
Figure 23:
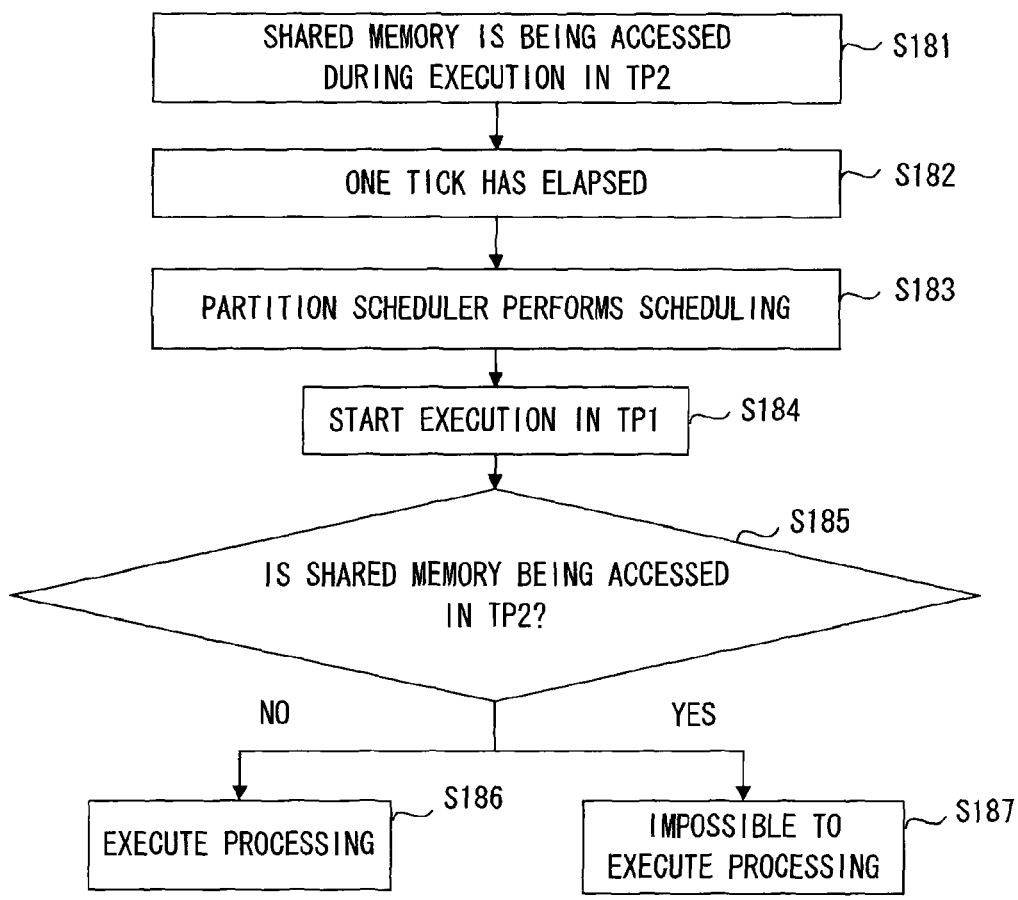
FIG. 23 is a diagram for explaining a third problem of the present invention.
Figure 24:
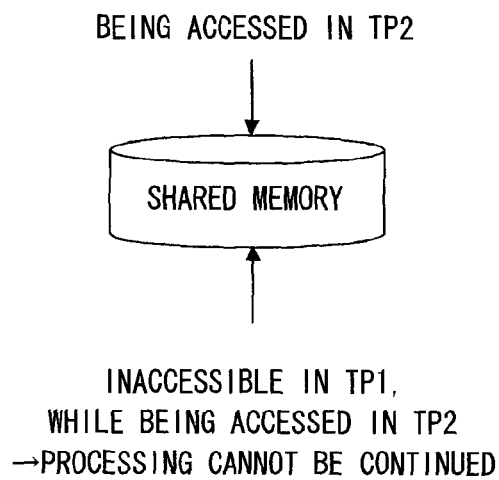
FIG. 24 is a diagram for explaining the third problem of the present invention.

Referring next to FIG. 22, the processing performed by the safety controller 1 according to this embodiment will be described in detail.

FIG. 22 is a flowchart showing a specific example of a procedure of access to the inter-partition shared memories. Referring to FIG. 22, a task scheduling pattern in which the time partition subsequent to TP2 corresponds to TP1 will be described by way of example.

Compared with the processing of S141 to S143 shown in FIG. 20, the processing shown in FIG. 22 is different from the processing in S163 and S164. Specifically, when access is made from the normal control task 26 in TP2 to an interpartition shared memory, the OS 100 judges whether the access is made from the task that should make access (S163). When the access is not made from the task that should make access (No in S163), information indicating occurrence of an access abnormality is stored in the shared memory 29 (S164). As for the judgment in S163, for example, when access is continuously made to the same inter-partition shared memory a prescribed number of times, it can be judged that the access is not made from the task that should make access. An appropriate value is preliminarily set as the prescribed number of times by a user. The other processing of S161 to S165 shown in FIG. 22 is basically identical with the processing of S141 to S143 shown in FIG. 20.

Compared with the processing of S144 to S148 shown in FIG. 20, the processing shown in FIG. 22 is different from the processing in S168 and S172. Specifically, the OS 100 judges occurrence of an abnormality in the access to the shared memory 29 based on the information indicating the presence or absence of occurrence of an abnormality stored in S164 (S168). If an abnormality has occurred (Yes in S168), an instruction is sent to the partition scheduler 21 to execute switching of time partitions or to reset the microcontroller 15. Note that the other processing of S168 to S172 shown in FIG. 22 is basically identical with the processing of S144 to S148 shown in FIG. 20.

According to this embodiment described above, also when a task in any of the time partitions accesses the shared memory 29, it is possible to ensure data sharing between partitions accurately (without omission).

<Ninth Embodiment of the Invention>

A safety controller according to this embodiment is a modification of the safety controller 1 described above. The overall configuration of the safety controller according to this embodiment may be similar to the configuration of the safety controller 1 shown in FIG. 1. A task execution environment provided by an OS included in the safety controller according to this embodiment is basically similar to the configuration of the task execution environment shown in FIG. 4, but is different in that the partition scheduler 21 has a task scheduler function. Accordingly, the same components as those of the embodiments described are above omitted, and different components will be mainly described below.

This embodiment is characterized in that the partition scheduler 21 executes also schedulers for each task in each time partition, instead of employing the configuration in which the task schedulers 23, 25, and 27 exist in the respective time partitions.

The related art having the time partitioning function is generally under such circumstances that: (a) an execution time used by each task is sufficiently longer (for example, 1 msec) than a processing time used by each partition scheduler or a processing time used by each task scheduler; and (b) different scheduling methods are required for each time partition, so that it is necessary to provide task schedulers for each time partition, for example. However, the safety controller 1 according to this embodiment is under such circumstances that an execution time used by each task is extremely short (for example, 30 usec) because an application for controlling a service robot or the like is assumed, and there is no need to change task scheduling for each time partition. Accordingly, in this embodiment, the partition scheduler 21 carries out scheduling of tasks in each time partition in addition to scheduling of each time partition.

In this embodiment, the partition scheduler 21 also carries out scheduling of tasks in each time partition. Thus, in the procedure shown in FIG. 6, for example, the partition scheduler 21 may execute the processing of S12 and S16, instead of the task schedulers.

Figure 25A:
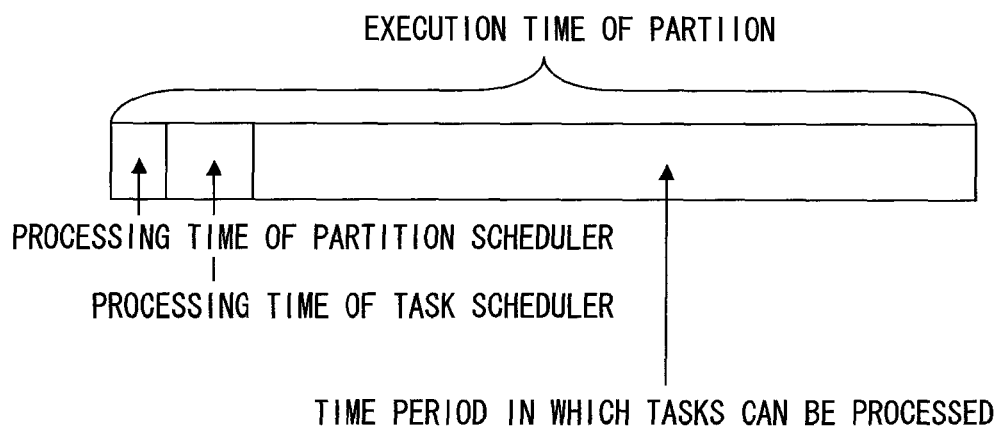
FIG. 25A is a diagram for explaining an effect of the related art.
Figure 25B:
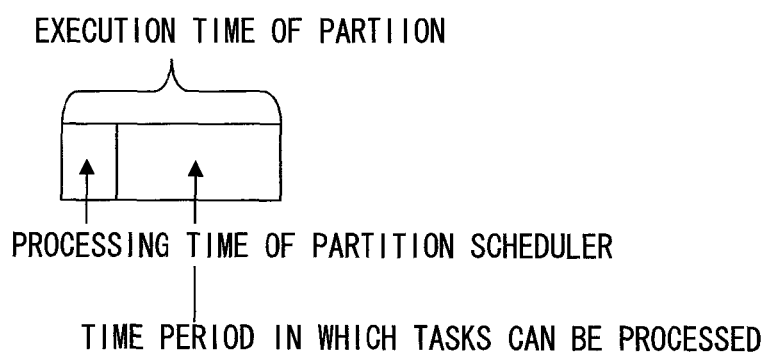
FIG. 25B is a diagram for explaining an effect of the present invention.

Referring to FIGS. 25A and 25B, effects of this embodiment will be described.

FIGS. 25A and 25B are diagrams each showing a ratio of each processing to a single time partition. FIG. 25A shows the ratio according to the related art, and a processing time used by the task scheduler is required separately from a processing used by the partition scheduler 21. FIG. 25B shows the ratio according to this embodiment. The processing time used by the task scheduler is included in the processing time used by the partition scheduler 21, and the time period in which tasks can be processed is short.

According to this embodiment described above, the task scheduler is integrated in the partition scheduler 21, thereby improving the efficiency of the entire system. Further, this embodiment is suitably applied to a motor control ECU (Electronic Control Unit), which is mounted in a service robot or the like and has a relatively small control period, or a service robot whose processing is relatively simple, for example.

Moreover, the present invention is not limited to the above embodiments, and various modifications can be made without departing from the scope of the present invention as described above. For example, each of the above embodiments may be carried out singly, or a combination of a plurality of embodiments may be carried out. For example, upon occurrence of an abnormality requiring an emergency stop, the technique according to the second or third embodiment may be applied. Upon occurrence of other abnormalities, the technique according to the fourth embodiment may be used to judge occurrence of an abnormality. For example, in the case of executing scheduling related to time partitions and tasks, the technique according to the fifth or sixth embodiment may be applied. Upon occurrence of an abnormality during execution of the scheduled task, the technique according to any one of the second to fourth embodiments may be applied. Furthermore, for example, in the case of performing data communication between tasks using the shared memory 29, one of the seventh and eighth embodiments may be combined with any of the first to sixth embodiments.

REFERENCE SIGNS LIST

1 SAFETY CONTROLLER
10 PROCESSOR
11 EXECUTION MEMORY
12 I/O PORT
13 NONVOLATILE MEMORY
14 RESET CIRCUIT
15 MICROCONTROLLER
21 PARTITION SCHEDULER
22 SCHEDULING TABLE
23, 25, 27 TASK SCHEDULER
24 SAFETY MONITORING TASK
26 NORMAL CONTROL TASK
28 SAFETY CONTROL TASK
29 SHARED MEMORY
100 OPERATING SYSTEM
101 SAFETY MONITORING APPLICATION
102 NORMAL CONTROL APPLICATION
103 SAFETY CONTROL APPLICATION

The invention claimed is:

1. A safety controller comprising:
a hardware resource including at least one processor; and
a system program for controlling allocation of an execution time of the processor to a plurality of programs including (a) a safety monitoring program for monitoring occurrence of an abnormality related to a control target, (b) a normal control program related to control of the control target during normal time, and (c) a safety control program related to control of the control target upon occurrence of the abnormality, the execution time being a single execution time for execution of all the plurality of programs, wherein
the system program includes a partition scheduler that schedules according to a scheduling pattern of a plurality of partitions including (d) a first time partition in which the execution time is exclusively allocated to the safety monitoring program, (e) a second time partition in which the execution time is exclusively allocated to the normal control program, and (f) a third time partition in which the execution time is exclusively allocated to the safety control program,
the processor executes the system program to cause the partition scheduler to schedule periodically according to the scheduling pattern, and
the partition scheduler is activated upon detection of the abnormality by the safety monitoring program executed in the first time partition and the normal control program executed in the second time partition, and performs switching from one of the first time partition and the second time partition to the third time partition, even when a time resource is left in one of the first time partition and the second time partition,
wherein the plurality of programs have respective priorities assigned thereto, and
the partition scheduler decides a program of the plurality of programs to be subsequently executed according to the priorities of the plurality of programs and an amount of execution time remaining in the plurality of time partitions in which the programs are executed, and performs switching to a time partition of the plurality of time partitions in which the decided program executes.

2. The safety controller according to claim 1, wherein the partition scheduler is forcibly activated upon detection of the abnormality by the normal control program executed in the second time partition, and immediately performs switching from the second time partition to the third time partition.

3. The safety controller according to claim 1, wherein
upon detection of the abnormality, the normal control program judges whether an amount of execution time is remaining in the second time partition in which the normal control program is executed, and notifies the partition scheduler of a request for switching the time partition when there is an amount of execution time remaining, and
upon receiving, from the normal control program, the notification of the request for switching the time partition, the partition scheduler switches the time partition from the second time partition to the third time partition.

4. The safety controller according to claim 1, wherein
the system program includes a task scheduler that performs scheduling of the plurality of programs to be executed in the plurality of time partitions, and
the partition scheduler causes the task scheduler to operate, and judges a running status of each of the plurality of programs in the plurality of time partitions according to a number of times of switching of the programs by the task scheduler.

5. The safety controller according to claim 4, wherein
the partition scheduler includes the task scheduler, and
the partition scheduler causes the task scheduler to operate.

6. The safety controller according to claim 1, wherein the partition scheduler retrieves a program of the plurality of programs to be subsequently executed according to the priorities of the plurality of programs, and decides the retrieved program as a program of the plurality of programs to be subsequently executed, when there is an amount of execution time remaining in the time partition in which the retrieved program is executed.

7. The safety controller according to claim 1, wherein the partition scheduler retrieves a time partition of the plurality of time partitions in which there is amount of execution time remaining, and decides a program of the plurality of programs to be subsequently executed according to the priorities in the time partition retrieved.

8. The safety controller according to claim 1, further comprising a shared memory for use in data communication between a first program and a second program, the first program and the second program being selected from the safety monitoring program, the normal control program, and the safety control program, the shared memory being configured to be divided into a plurality of shared portions, when the first program is accessing any of the plurality of shared portions of the shared memory, an access destination of the second program is set to a shared portion of the plurality of shared portions which is not accessed by the first program.

9. The safety controller according to claim 8, the abnormality is detected when the first program is accessing any of the plurality of shared portions of the shared memory a predetermined number of times or more.

10. A safety control method for a control target, comprising the steps of:

controlling allocation of an execution time of a processor to a plurality of programs including (a) a safety monitoring program for monitoring occurrence of an abnormality related to a control target, (b) a normal control program related to control of the control target during normal time, and (c) a safety control program related to control of the control target upon occurrence of the abnormality, the execution time being a single execution time for execution of all the plurality of programs, wherein scheduling according to a scheduling pattern of a plurality of partitions including (d) a first time partition in which the execution time is exclusively allocated to the safety monitoring program, (e) a second time partition in which the execution time is exclusively allocated to the normal control program, and (f) a third time partition in which the execution time is exclusively allocated to the safety control program, scheduling, by a partition scheduler, periodically according to the scheduling pattern, and scheduling, by the partition scheduler, is activated upon detection of the abnormality by the safety monitoring program executed in the first time partition and the normal control program executed in the second time partition, and performs switching from one of the first time partition and the second time partition to the third time partition, even when a time resource is left in one of the first time partition and the second time partition wherein the plurality of programs have respective priorities assigned thereto, and deciding, by the partition scheduler, a program of the plurality of programs to be subsequently executed according to the priorities of the plurality of programs and an amount of execution time remaining in the plurality of time partitions in which the programs are executed, and performs switching to a time partition of the plurality of time partitions in which the decided program executes.

11. The safety control method according to claim 10, further comprising the step of judging a running status of each of the plurality of programs in the plurality of time partitions according to a number of times of switching of the programs.

12. The safety control method according to claim 10, further comprising the step of accessing a shared memory for use in data communication between a first program and a second program, the first program and the second program being selected from the safety monitoring program, the normal control program, and the safety control program, the shared memory being configured to be divided into a plurality of shared portions, when the first program is accessing any of the plurality of shared portions of the shared memory, an access destination of the second program is set to a shared portion of the plurality of shared portions which is not accessed by the first program.

* * * * *